US010604852B2

(12) United States Patent
Cronin et al.

(10) Patent No.: US 10,604,852 B2
(45) Date of Patent: Mar. 31, 2020

(54) APPARATUS AND METHODS FOR THE ELECTROCHEMICAL GENERATION OF OXYGEN AND/OR HYDROGEN

(71) Applicant: The University Court of the University of Glasgow, Glasgow, Strathclyde (GB)

(72) Inventors: Leroy Cronin, Glasgow (GB); Mark Symes, Glasgow (GB)

(73) Assignee: THE UNIVERSITY COURT OF THE UNIVERSITY OF GLASGOW, Glasgow (GB)

( * ) Notice: Subject to any disclaimer, the term of this patent is extended or adjusted under 35 U.S.C. 154(b) by 359 days.

(21) Appl. No.: 14/357,066

(22) PCT Filed: Nov. 8, 2012

(86) PCT No.: PCT/GB2012/052784
§ 371 (c)(1),
(2) Date: May 8, 2014

(87) PCT Pub. No.: WO2013/068754
PCT Pub. Date: May 16, 2013

(65) Prior Publication Data
US 2014/0318979 A1    Oct. 30, 2014

(30) Foreign Application Priority Data

Nov. 8, 2011   (GB) .................................. 1119283.8

(51) Int. Cl.
C25B 1/10    (2006.01)
C25B 1/00    (2006.01)
(Continued)

(52) U.S. Cl.
CPC ................ *C25B 1/10* (2013.01); *C25B 1/003* (2013.01); *C25B 5/00* (2013.01); *C25B 15/08* (2013.01); *Y02E 60/368* (2013.01)

(58) Field of Classification Search
CPC ........... C25B 1/10; C25B 15/08; C25B 1/003; C25B 5/00; Y02E 60/368
(Continued)

(56) References Cited

U.S. PATENT DOCUMENTS 4,176,026 A * 11/1979 Harriman ................ C01B 3/042
                                                      204/157.5
4,492,743 A *  1/1985 Howe ...................... C25B 1/003
                                                      204/290.04
(Continued)

FOREIGN PATENT DOCUMENTS

WO    2007122431 A1   11/2007
WO    2009035525 A2    3/2009
(Continued)

OTHER PUBLICATIONS

Search report for GB1119283.8 dated Mar. 8, 2012.
(Continued)

*Primary Examiner* — Nicholas A Smith
*Assistant Examiner* — Colleen M Raphael
(74) *Attorney, Agent, or Firm* — Benesch, Friedlander, Coplan & Aronoff LLP

(57) ABSTRACT

The invention provides methods for producing hydrogen and oxygen, comprising the steps of: (i) oxidising a mediator at a working electrode to yield an oxidised mediator, and reducing protons at a counter electrode to yield hydrogen; and (ii) reducing an oxidised mediator at a working electrode to yield a mediator, and oxidising water at a counter electrode to yield oxygen, wherein the oxygen generation step is performed non-simultaneously to the hydrogen gen-
(Continued)

eration step, and the oxidised mediator of step (i) is used as the oxidised mediator of step (ii), or the mediator of step (ii) is used as the mediator of step (i), and the mediator has a reversible redox wave lying between the onset of the oxygen evolution reaction (OER) and the hydrogen evolution reaction (HER).

24 Claims, 15 Drawing Sheets

(51) Int. Cl.
   C25B 15/08        (2006.01)
   C25B 5/00         (2006.01)
(58) Field of Classification Search
   USPC .................. 204/157.5, 157.52; 205/340;
                                              422/186–187
   See application file for complete search history.

(56)           References Cited

U.S. PATENT DOCUMENTS

| 5,468,628 | A | * | 11/1995 | Aust | .................. | C02F 1/70 |
|---|---|---|---|---|---|---|
| | | | | | | 423/659 |
| 2003/0019758 | A1 | | 1/2003 | Gopal | | |
| 2004/0256247 | A1 | | 12/2004 | Carson et al. | | |
| 2005/0112055 | A1 | | 5/2005 | Shannon et al. | | |
| 2005/0161342 | A1 | * | 7/2005 | Carson | .................. | C10J 3/00 |
| | | | | | | 204/242 |
| 2007/0012578 | A1 | | 1/2007 | Edvinsson Albers et al. | | |
| 2008/0286643 | A1 | * | 11/2008 | Iwasaki | .................. | C25B 1/003 |
| | | | | | | 429/111 |
| 2009/0061267 | A1 | * | 3/2009 | Monzyk | .................. | C25B 1/003 |
| | | | | | | 204/660 |
| 2012/0027666 | A1 | * | 2/2012 | Hill | .................. | B01J 35/004 |
| | | | | | | 423/579 |
| 2012/0267240 | A1 | * | 10/2012 | Ke | .................. | C25B 1/003 |
| | | | | | | 204/242 |
| 2013/0256152 | A1 | * | 10/2013 | Creeth | .................. | C25B 1/003 |
| | | | | | | 205/637 |

FOREIGN PATENT DOCUMENTS

| WO | 2010107919 | A1 | 9/2010 |
|---|---|---|---|
| WO | 201012833 | A1 | 11/2010 |
| WO | 2012049494 | | 4/2012 |

OTHER PUBLICATIONS

Search report for PCT/GB2012/052784 dated Jan. 30, 2013.
Abe et al., "Development of New Photocatalytic Water Splitting into H2 and O2 using Two Different Semiconductor Photocatalysts and Shuttle Redox Mediator IO3-/I-" J. Phys. Chem. B., vol. 109, 2005, pp. 16052-16061.
Armaroli et al., "The Hydrogen Issue" ChemSusChem, vol. 4, 2011, pp. 21-36.
Atlam, "An Experimental and Modeling Study of a Photovoltaic/ Proton-Exchange Membrane Electrolyser System", International Journal of Hydrogen Energy, vol. 34, 2009, pp. 6589-6595.
Bamwenda et al. "The Photocatalytic Oxidation of Water to O2 over Pure CeO2, WO3, and TiO2 using Fe3+ and Ce4+ as Electron Acceptors" Applied Catalysis A: General, vol. 205, 2001/pp. 117-128.
Barber "Photosynthetic Energy Conversion: Natural and Artificial" Chem. Soc. Rev., vol. 38, 2009, pp. 185-196.
Barbir, "PEM Electrolysis for Production of Hydrogen from Renewable Energy Sources" Solar Energy, vol. 78, 2005, pp. 661-669.
Bard, "Photoelectrochemistry and Heterogeneous Photo-Catalysis at Semiconductors" Journal of Photochemistry, vol. 10, 197, pp. 59-75.
Blankenship et al., "Comparing Photosynthetic and Photovoltaic Efficiencies and Recognizing the Potential for Improvement" www.sciencemag.org, Science, vol. 13, 2011, pp. 805-809.
Burke, et al., "The Oxygen Electrode, Part 8.—Oxygen Evolution at Ruthenium Dioxide Anodes", J. Chem. Soc., Farday Trans. 1, vol. 73, 1977, pp. 1659-1671.
Chen et al., "Semiconductor-based Photocatalytic Hydrogen Generation" Chem. Rev., vol. 110, 2010, pp. 6503-6570.
Cook et al., "Solar Energy Supply and Storage for the Legacy and Nonlegacy Worlds" Chem. Rev., vol. 110, 2010, pp. 6474-6502.
Damjanovic et al., "Electrode Kinetics of Oxygen Evolution and Dissolution on Rh, Ir and Pt—Rh Alloy Electrodes" J. Electrochem Soc., vol. 113, No. 7, 1966, pp. 739-746.
Darwent et al., "Photo-Oxidation of Water Sensitized by WO3 Powder" J. Chem. Soc., Faraday Trans. 2, vol. 78, 1982, pp. 359-367.
Davis et al., "Future CO2 Emissions and Climate Change from Existing Energy Infrastructure" www.sciencemag.org, Science, vol. 329, 2010. pp. 1330-1333.
Engstrom et al., "Characterization of Electrochemically Pretreated Glassy Carbon Electrodes" Anal. Chem., vol. 56, 1984, pp. 136-141.
Erbs et al., "Visible-Light-Induced O2, Generation from Aqueous Dispersions of WO3" J. Phys. Chem., vol. 88, 1984, pp. 4001-4006.
Funk, "Thermochemical Hydrogen Production: Past and Present" International Journal of Hydrogen Energy, vol. 26, 2001, pp. 185-190.
Gratzel, "Photoelectrochemical Cells" Nature, vol. 414, 2001, pp. 338-344.
Gust et al., "Solar Fuels via Artificial Photosynthesis" Acc. Chem. Res., vol. 42, No. 12, 2009, pp. 1890-1898.
Hernandez-Pagan et al., "Resistance and Polarization Losses in Aqueous Buffer-Membrane Electrolytes for Water-Splitting Photoelectrochemical Cells" Energy Environ. Sci., vol. 5, 2012, pp. 7582-7589.
Himeno et al., "Differene in Voltammetric Properties between the Keggin-Type [XW12O40}n- and [XMo12O40]n-Complexes" Journal of Electroanalytical Chemistry, vol. 528, 002, pp. 170-174.
Holladay et al., "An Overview of Hydrogen Production Technologies" Catalysis Today, vol. 139,2009, pp. 244-260.
Huskinson et al., "A Metal-Free Organic-Inorganic Aqueous Flow Battery" Nature, vol. 505, 2014, pp. 195-210.
Hydrogen Analysis Resource Center. Merchant Liquid and Compressed Gas Hydrogen Production Capacity in the U.S. and Canada by Company and Location, spreadsheet, 13 pages.
Itagaki et al., "Heteropoly Acid-Based Materials for Reversible H2 Storage as Protons and Electrons under Mild Conditions" Chemistry Materials, vol. 23, 2011, pp. 4102-4104.
Kanan et al., "In Situ Formation of an Oxygen-Evolving Catalyst in Netural Water Containing Phosphate and Co2+" www.sciencemag.org, Science, vol. 321, 2008, pp. 1072-1075.
Lewis et al., "Powering the Planet: Chemical Challenges in Solar Energy Utilization" Proc. Natl. Acad. Sci., vol. 103, No. 43, 2006, pp. 15729-15735.
Lodi, et al., "Ruthenium Dioxide-Based Film Electrodes. III. Effect of Chemical Composition and Surface Morphology on Oxygen Evolution in Acid Solutions" J. Appl. Electrochem., vol. 8, 1978, pp. 135-143.
Lu et al., "Photocatalyst Releasing Hydrogen from Water, Enhancing Catalytic Performance Holds Promise for Hydrogen Production by Water Splitting in Sunlight" Nature, vol. 440, 2006, p. 295.
Maeda "A Voltammetric Study of Keggin-Type Hetropolymolyybdaate Anions" J. of Electroanalytical Chem., vol. 364, 1994, pp. 149-154.
Maeda et al., "Efficient Nonsacrificial Water Splitting through Two-Step Photoexcitation by Visible Light using a Modified Oxynitride as Hydrogen Evolution Photocatalyst" J. Am. Chem. Soc., vol. 132, 2010, pp. 5858-5868.
Merki et al., "Amorphous Molybdenum Sulfide Films as Catalysts for Electrochemical Hydrogen Production in Water" Chem. Sci., vol. 2, 2011, pp. 1262-1267,
Millet et al., "Electrochemical Performances of PEM Water Electrolysis Cells and Perspectives" Int. J. Hydrogen Energy, vol. 36, 2011, pp. 4134-4142.

(56) References Cited

OTHER PUBLICATIONS

Miras et al., "Exploring the Structure and Properties of Transition Metal Templated {VM17(VO4)2} Dawson-Like Capsules" Inorganic Chemistry, vol. 50, 2011, pp. 884-8391.

Miras et al., "Unraveling the Complexities of Inorganic and Supramolecular Self-Assembly in Solution with Electrospray and Cryospray Mass Spectrometry" Chem. Commun., 2009, pp. 1297-1311.

Miseki et al., "Cs~MOdified WO3 Photocatalyst Showing Efficient Solar Energy Conversion for O2 Production and Fe (III) Ion Reduction under Visible Light" J. Phys. Chem. Lett., vol. 1, 2010, pp. 1196-1200.

Olah et al., "Anthropogenic Chemical Carbon Cycle for a Sustainable Future" J. Am. Chem. Soc., vol. 133, 2011, pp. 12881-12898.

Onuki et al., "Thermochemical Water-Splitting Cycle using Iodine and Sulfur" Energy Environ. Sci., vol. 2, 2009, pp. 491-497.

Paul et al., "Optimal Coupling of PV Arrays to PEM electrolysers in Solar-Hydrogen Systems for Remote Area Power Supply" International Journal of Hydrogen Energy, vol. 33, 2008, pp. 490-498.

Pozio et al. "Nafion Degradation in PEFCs from End Plate Iron Contamination" Electrochemica Acta, vol. 48, 2003, 1543-1549.

Schrock "Reduction of Dinitrogen" Proc. Nat'l Acad. Sci., vol. 103, No. 46, 2006, p. 17087.

Skolnik "Compilation of Site Visit-Based Techinical Evlauations of Hydrogen Projects 1996-2001" Washington DC 2002.

Sleutels et al. "Ion Transport Resistance in Microbial Electrolysis Cells with Anion and Cation Exchange Membranes" Int'l J. of Hydrogen Energy, vol. 34, 2009 pp. 3612-3620.

Tanaka et al., "Volammetric and Spectroelecctrochemical Studies on 12-Molybdophosphoric Acid in Aqueous and Water-Dioxane Solutions at a Gold-Minigrid Optically Transparent Thin-Layer Electrode" Inorg. Chem, vol. 21, 1982, pp. 1662-1666.

Tsigdinos "Preparation and Characterization of 12-Molybdophosphoric and 12-Molybdosilicic Acids and Their Metal Salts", Ind. Eng. Chem. Prod. Res. Develop., vol. 13, 1974, pp. 267-274.

Walter et al., "Solar Water Splitting Cells" Chem. Rev., vol. 110, 2010, pp. 6446-6473.

Long et al., "Polyoxometalates: Building Blocks for Functional Nanoscale Systems", Agnew. Chem. Int. Ed., vol. 49, 2010, pp. 1736-1758.

Chinese office action to corresponding Chinese patent application No. 201280066403.5, dated Jan. 12, 2016, 8 pages.

European office action to corresponding European patent application No. 12790944.8, dated Apr. 20, 2016, 3 pages.

\* cited by examiner

OER 10 times faster with PEB

HER around 30 times faster with PEB

APPARATUS AND METHODS FOR THE ELECTROCHEMICAL GENERATION OF OXYGEN AND/OR HYDROGEN

RELATED APPLICATION

The present case claims the benefit and priority of GB 1119283.8 filed on 8 Nov. 2012 (08/11/2011), the contents of which are hereby incorporated by reference in their entirety.

FIELD OF THE INVENTION

The present invention relates to methods for the preparation of hydrogen and/or oxygen using electrochemical means, and optionally using light as a source of power. The invention also relates to the use of a redox active chemical mediator in such methods. Also provided are electrochemical cells for the production of hydrogen and/or oxygen.

BACKGROUND TO THE INVENTION

The need for sustainable, carbon-neutral technologies to meet the world's growing demand for energy has become a widely acknowledged imperative. However, despite this realization, renewable energy sources such as wind and solar power remain under-exploited as large-scale replacements for fossil fuels. This is largely due to the intermittency of supply: a reliable way of storing the energy generated by renewable sources must be found in order to compensate for periods during which the wind does not blow or the sun does not shine. An especially attractive solution to this problem is to store sustainably-generated energy in the form of chemical bonds by the electrochemical splitting of water to produce oxygen ($O_2$) and hydrogen ($H_2$).

Oxygen-evolving reaction (OER):

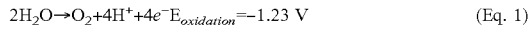
$$2H_2O \rightarrow O_2 + 4H^+ + 4e^-\ E_{oxidation} = -1.23\ V \quad (Eq.\ 1)$$

Hydrogen-evolving reaction (HER):

$$4H^+ + 4e^- \rightarrow 2H_2\ E_{reduction} = 0.0\ V \quad (Eq.\ 2)$$

Equations 1 and 2 give the half-reactions for water-splitting at room temperature at pH 0, showing that the theoretical minimum voltage which must be supplied to drive the OER and the HER simultaneously is 1.23 V. In practice, however, additional energy (hereafter termed "overpotential") must be supplied to surmount various systemic and kinetic barriers, which means that voltages well in excess of 1.6 V are typically needed in order to provide simultaneous OER and HER.

There is a desire to develop technologies that allow the production of hydrogen and oxygen at lower effective voltages.

A particular focus of the research into hydrogen and oxygen production is the utilisation of light as an energy source for the electrochemical reaction. In some circumstances this may simply be the use of photovoltaic cells to provide the bias in a hydrogen- and oxygen-producing electrochemical cell. However, there is now a real interest in the use of photo electrochemical cells for hydrogen and oxygen production. Thus a photo responsive material is present within the cell itself, and its photochemical response drives the electrochemistry within the cell. The photoresponsive material may be referred to as a photo catalyst, for example. Materials that have been found suitable for use in the generation of oxygen from water include $WO_3$ (see Erbs et al.), which may be combined with other materials for improved photocatalytic activity.

In many natural and artificial photochemical Z-schemes (a two-step photoexcitation system) a redox mediator is employed to facilitate the electrochemical generation of hydrogen and oxygen, allowing the large voltage gap between OER onset and HER onset to be traversed in two smaller steps. The use of a mediator removes the requirement that a single photo catalyst must simultaneously effect water oxidation and proton reduction, and instead couples separate, optimized photo catalyst ensembles for OER and HER together.

An example of a hydrogen and oxygen generating system in a photochemical Z-scheme is described by Maeda et al. Here, a $IO_3^-/I^-$ pair is used as a mediator between the oxygen evolution step, which utilities a Pt-loaded $WO_3$ photo catalyst, and the hydrogen evolution step, which utilises a Pt-modified oxynitride photo catalyst. The entire process is performed in one pot, and the hydrogen and oxygen products are collected together.

The generation of oxygen using a modified $WO_3$ catalyst is described by Miseki et al. Here, $Fe^{3+}$ is used as the mediator, which is reduced to $Fe^{2+}$ with concomitant production of oxygen. The authors focus on improving the generation of oxygen only. The reduced iron species, it is noted, may be regenerated as $Fe^{3+}$ in a separate electrochemical step, using a photo catalyst and a sacrificial electron donor, such as an organic compound. Thus, the mediator is not linked to the production of hydrogen.

Both sacrificial (the mediator is destroyed as water is split) and recyclable mediator systems have been described. However, the majority of the mediators described (especially the most commonly used $Fe^{2+}/Fe^{3+}$ system) are incompatible with the polyelectrolyte membranes that would be required by practical electrochemical systems. Furthermore, the mediators are used in solution together with the photocatalysts, where they attenuate the light reaching the photoactive material and participate in unproductive back-reactions. Thus, typical mediator concentrations are in the low millimolar range, where OER and HER remain tightly coupled (one can only occur if the other also proceeds at an appreciable rate). This means that hydrogen and oxygen are necessarily produced simultaneously, with the rate of one half reaction dependent on the rate of the other usually OER is the rate determining step (RDS), being up to 1,000 times slower than HER.

There is a need for an electrochemical system and electrochemical methods for generating hydrogen and oxygen at low potentials. A system and a method that are suitable for use with a sustainably derived energy source are particularly desirable. A system that is adaptable for use in a standard electrochemical cell and a photo electrochemical cell would be particularly advantageous.

SUMMARY OF THE INVENTION

The present inventors have identified a particular class of mediators that have useful reduction and oxidation properties. These mediators may be reliably and reproducibly exploited in a method for generating hydrogen and/or oxygen using electrochemical, including photo electrochemical, means.

In a general aspect the present invention provides the use of a mediator, which is capable of reversibly accepting electrons ($e^-$) and/or protons ($H^+$), in the generation of hydrogen and/or oxygen from water. In one embodiment, the mediator has a reversible redox wave lying between the onset of the oxygen evolution reaction (OER) and the hydrogen evolution reaction (HER). The reduction peak may a one, two, or multi-electroredox wave.

In one embodiment, the mediator is capable of accepting and donating electrons, or accepting and donating electrons and protons. In one embodiment, the mediator is a polyoxometallate, for example $[Mo_{12}PO_{40}]^{3-}$ and $[Mo_{12}PO_{40}]^{5-}$, and the acidic forms thereof, for example $H_3Mo_{12}PO_{40}$ and $H_5Mo_{12}PO_{40}$. In one embodiment, the mediator is a quinone compound, together with the dihydro form thereof.

The mediator described herein may be used at high concentrations within an electrochemical cell. At such concentrations, the mediator may be used advantageously to decouple the oxygen and hydrogen-evolving half reactions of water electrolysis. The mediator described herein is oxidatively and thermally stable. The mediator allows hydrogen and oxygen to be generated as a two-step process, via the oxidation and reduction of the mediator. Each of these steps may be performed using a relatively low voltage. This may be contrasted with a method where oxygen and hydrogen are generated in one step without a mediator. Here the voltage required (both on a theoretical and practical level) is significantly higher. Thus, methods utilising a mediator are particularly suitable for situations where the power supply is limited, for example in developing nations where electrical supply is uncertain.

Moreover, the use of lower voltages is associated with reduced degradation of the components of an electrochemical cell, for example the electrodes, the membrane and other components.

Decoupling oxygen and hydrogen production steps also has the advantage that, for a given voltage, the rates of production are increased. Production rates in systems where the oxygen and the hydrogen production are tightly coupled are generally relatively low.

Experiments conducted by the inventors indicate that the systems developed, which incorporate the mediator described herein, can provide extremely high Faradaic efficiencies. Thus, the methods of the present invention have at least 90% Faradaic efficiency, and may have substantially 100% Faradaic efficiency.

The mediator is suitable for use in methods having a high current flow. The use of the mediator is not associated with mass transfer limitations in the electrochemical reactions described herein. The rate of electron and/or proton transfer is relatively fast, and useful quantities of hydrogen and oxygen may be produced in a practical time frame.

In a first aspect of the invention, there is provided a method for the generation of hydrogen, the method comprising the step of oxidising a mediator, such as a polyoxometallate, at a working electrode to yield an oxidised mediator, such as an oxidised polyoxometallate, and reducing protons at a counter electrode to yield hydrogen.

In a second aspect of the invention, there is provided a method for the generation of oxygen, the method comprising the step of reducing a mediator, such as a polyoxometallate at a working electrode to yield a reduced mediator, such as a reduced polyoxometallate, and oxidising water at a counter electrode to yield oxygen. The oxidation of water also produces protons.

The oxidised mediator, such as the oxidised polyoxometallate of the first aspect of the invention may be the same as the mediator, such as the polyoxometallate of the second aspect of the invention. The reduced mediator, such as the reduced polyoxometallate of the second aspect of the invention may be the same as the mediator, such as the polyoxometallate of the first aspect of the invention.

In a third aspect of the invention there is provided a method for the generation of hydrogen and oxygen, the method comprising the steps of generating hydrogen according to the first aspect of the invention and/or the step of generating oxygen according to the second aspect of the invention. Where one of the methods of the first and second aspect is not used, a known method for the generation of hydrogen or oxygen may be used in combination with the other of the methods of the first or second aspect. The hydrogen and oxygen generating steps may be performed separately (non-simultaneously). Together, the hydrogen and oxygen generating steps may be referred to as the electrolysis of water. In this method, the mediator, such as a polyoxometallate, acts as a mediator by accepting, storing and donating electrons and protons between the oxygen and hydrogen generation steps. In one embodiment, the generation of hydrogen and oxygen may be performed as a two-step photoexcitation (Z-scheme).

As noted above, the oxygen generation step is performed non-simultaneously to the hydrogen generation step. Here, two smaller energy inputs are used to split water to give hydrogen and oxygen at different times, as opposed to a single energy input which produces hydrogen and oxygen simultaneously.

The methods of the first and second aspects of the invention may be performed at modest voltages, for example at voltages of about 1.0 V. The methods described herein are safe, require low power, and may be combined with photo electrochemical methods, for example utilising sunlight as a power source to power the electrochemical generation of hydrogen and/or oxygen.

In a fourth aspect of the invention there is provided the use of a mediator as described herein as an $e^-$ acceptor in a method of generating oxygen from water and/or the use of a mediator, such as a polyoxometallate, as an $e^-$ donor in a method of generating hydrogen from water. The mediator may be regarded as a donor and acceptor for $e^-$ and optionally $H^+$ also. The mediator may be used as a store for $e^-$ in an electrochemical cell. The mediator may be used as a store for $e^-$ and $H^+$ in an electrochemical cell. The mediator, such as polyoxometallate, is suitable for reversibly storing $e^-$ and optionally $H^+$ also. The electrochemical cell may be suitable for the generation of hydrogen and/or oxygen.

In a fifth aspect of the invention there is provided an electrolyte comprising a mediator as described herein. The electrolyte may be an aqueous electrolyte. The electrolyte may be an acidified electrolyte, for example at a pH of 2 or less, for example 2, 1 or 0. Alternatively, the mediator may be suitable for use at or around neutral pH. In one embodiment the electrolyte may have a pH in the range of about 3 to about 7.

In a sixth aspect of the invention there is provided an electrochemical cell having a working electrode, a counter electrode and an electrolyte according to the fifth aspect of the invention. The working electrode and the counter electrode define an electrolyte space, which space is divided into a working electrode space and a counter electrode space by a semi-permeable membrane. The membrane is impermeable to the mediator. The membrane may permit movement of protons from a working electrode side of the electrolyte space to a counter electrode side (or vice versa). The electrochemical cell may find use in the methods of the first to third aspects of the invention.

In a seventh aspect of the invention there is provided a mixture comprising a first photo catalyst suitable for light-induced oxygen generation from water, and a mediator, as described herein, which is suitable for reduction.

In an eighth aspect of the invention there is a provided a mixture comprising a second photo catalyst suitable for light-induced hydrogen generation from water, and a mediator, as described herein, which is suitable for oxidation.

In a ninth aspect of the invention there is provided a mixture comprising a first photo catalyst suitable for light-induced oxygen generation from water, second photo catalyst suitable for light-induced hydrogen generation from water and a mediator, which is suitable for reversible oxidation and reduction.

The present invention also provides methods for the generation of hydrogen and/or oxygen using the mixtures of the seventh, eight and ninth aspects of the invention.

DETAILED DESCRIPTION OF THE INVENTION

Figure 1:
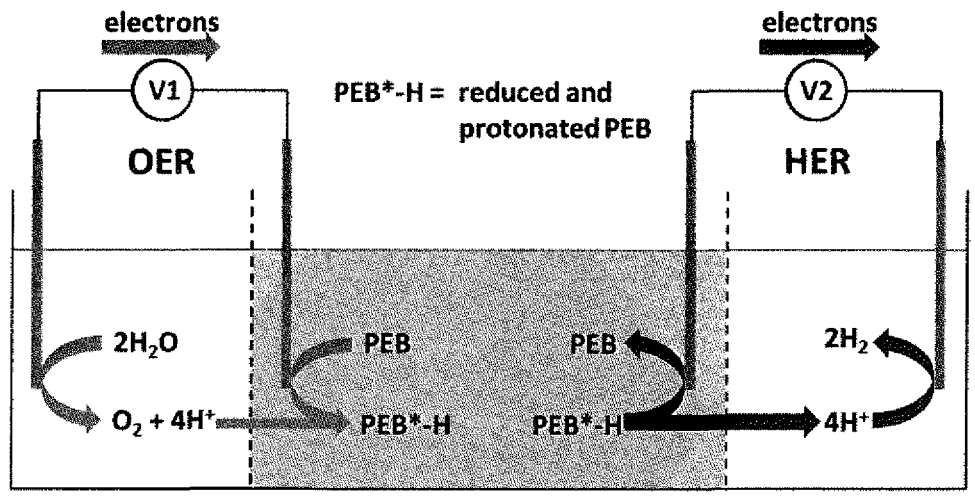
FIG. 1 is a schematic of a mediator-based approach to generating hydrogen and oxygen by water-splitting. The left-hand process (oxygen generation) need not occur simultaneously with the right hand process (hydrogen generation).

The present Invention provides methods for the electrochemical generation of hydrogen and oxygen using a mediator as an electron donor and acceptor in an electrochemical cell. The mediator may also be a proton donor and acceptor, and the mediator may act as a buffer for the electrolyte in an electrochemical cell. The mediator has a reversible redox wave at a potential between the onset of the oxygen evolution reaction (OER) and the hydrogen evolution reaction (HER).

Thus, in one embodiment, the present inventors have found that a polyoxometallate may be used as a mediator in an electrochemical process for the generation of hydrogen and/or oxygen. The mediator is capable of reversibly accepting and donating electrons in these electrochemical processes, and optionally also accepting and donating protons. The present inventors have found that compounds having a quinone group may be similarly used for this purpose.

In an oxygen generating step, the mediator may accept protons and electrons. The resultant reduced and protonated mediator may then donate protons and electrons in a subsequent hydrogen generating step. Conversely, a reduced and protonated mediator may be used initially to generate hydrogen, and the resultant oxidised mediator may then accept protons and electrons in a subsequent oxygen generating step.

The use of acidic polyoxometallates in a composite with Pt has previously been described as suitable for use in the storage of hydrogen, as protons and electrons, under mild conditions (see Itagaki et al.). This disclosure is purely limited to the use of the composite to store hydrogen. There is no mention here of the use of a polyoxometallate to act as an electron acceptor and donor or as a proton acceptor and donor. There is no suggestion that the redox characteristics of the polyoxometallate could be usefully applied to methods for the generation of hydrogen or oxygen in an electrochemical method. Indeed, there is no suggestion that the polyoxometallate could be used in methods that involve splitting water.

The use of polyoxometallates as catalysts in water splitting reactions has been previously described (see review by Long et al.). Here, the catalyst is used to lower the kinetic barrier to splitting water into hydrogen and oxygen. This may be contrasted with the methods described herein which utilize a polyoxometallate as an electron and hydrogen donor and acceptor in an electrochemical water splitting system.

Mediators that can reversibly store the protons and electrons produced during electrolytic water oxidation are particularly attractive for their ability to break the voltage input necessary to split water into two. Mediators for use in the present invention are those that are preferably highly water soluble, can effectively buffer the pH during water splitting, have fully reversible and cycle-able redox waves in between OER and HER, are stable in both their oxidised and reduced forms, and do not cause degradation of other components within the cell (e.g. electrodes and membranes). Using a mediator, the OER is decoupled from the HER, allowing $O_2$ and $H_2$ to be produced entirely separately in both space and time. This temporal separation allows greater flexibility in the type of membrane that may be used in acid-regime (photo)electrolysis cells, as gas impermeability is no longer a critical requisite for the production of pure $H_2$. Similarly, carbon electrodes can be used in combination with a reduced, protonated PEB to generate hydrogen from aqueous solutions at current densities that rival those achieved with platinum electrodes in a non-PEB cell.

The use of a $Fe^{II}/Fe^{III}$ relay and a $I^-/IO_3^-$ relay has previously been described in methods for the production of hydrogen and oxygen (see Domen et al.). However, the relays connected two different semiconductors, one for the OER and one for the HER, with a "chemical wire" so that both could occur simultaneously. As shown herein neither the $Fe^{II}/Fe^{III}$ relay nor the $I^-/IO_3^-$ relay is suitable for use as a mediator in the present invention.

Indeed work, previous on the $I^-/IO_3^-$ relay is believed to be suspect. The original work had suggested the $I^-/IO_3^-$ could be used to shuttle electrons between a photocathode for HER and a photoanode for the OER. However, Skolnik has noted in subsequent investigations, however, that much of the oxygen was likely coming from photodecomposition of the redox mediator $IO_3^-$. The mediator was being photolyzed by ultraviolet radiation that was being transmitted through a new quartz reactor. Thus there was clear evidence that the relay was not capable of producing acceptable levels of hydrogen.

Mediator

In one embodiment, a reference to a mediator is a reference to a reduced mediator. Such a mediator may therefore be oxidized (to give an oxidized mediator). In one embodiment, a reference to a mediator is a reference to an oxidized mediator. Such a mediator may therefore be reduced (to give a reduced mediator). The context will dictate whether reference is intended to a reduced or oxidized form of a mediator, as will be clear to a person of skill in the art. In some embodiments, such as the methods of the generation of hydrogen and oxygen, the mediator acts as a couple and is interconverted between oxidized and reduced forms, and this may occur within the electrochemical cell.

The mediators are oxidatively stable, and preferably thermally stable also. The present invention makes use of a mediator that has (at least) two different oxidation states, which oxidation states may be accessed by oxidation or reduction from one state to the other. In particular a mediator is thermally and oxidatively stable in both the oxidized form and the reduced form. The mediator has minimal cross reactivity with other components within an electronically cell (e.g. the electrodes and other components of the electrolyte). The mediator may also be stable to light, particularly visible light. This characteristic is useful, as recent developments in the production of oxygen and hydrogen, utilise photoactive components to provide the electromotive power for the methods. A mediator that is stable to illumination from visible light sources, such as sun light, is particularly desirable.

In one embodiment, the mediator for use in the present invention is a polyoxometallate. The polyoxometallate is an oxo-anion of a transition metal cluster. In one embodiment, the polyoxometallate is an acidic polyoxometallate, and references to polyoxometallate may be construed accordingly. Polyoxometallates for use as mediators, and the acid forms thereof, are thermally and oxidatively stable.

In other embodiments, the mediator for use in the present invention is a compound having a quinone group (a quinone compound). The reduced form of the quinone compound is a compound having a 1,4-dihydrobenzene or a 1,2-dihydrobenzene group. The quinone compound may include functional groups, such as hydroxyl, amino, carboxy, sulphate, and poly(alkyleneglycol) groups, which may solubilise the compound in an aqueous electrolyte.

The present inventors have determined that polyoxometallates, in a reduced or oxidised form, may be stored under ambient laboratory conditions (with respect to heat, light, pressure and humidity amongst others) for at least 25 days without appreciable decomposition. The integrity of a polyoxometallate may be gauged over time using standard analytical techniques, such as UV-Vis and NMR spectroscopes (for example $^{31}$P NMR, where a P atom is present in the polyoxometallate duster) and the like. Similar techniques may be employed to test the integrity of other mediators. It will also be appreciated that the integrity of the mediator may be tested by employing the mediator in a number of repeat cycles of oxygen and hydrogen generation steps according to the present invention. Over number of cycles, for example 4 or more, the mediator may be present without appreciable degradation. For example, 85% or more of the mediator, such as 90% or more, may be present after these cycles.

In one embodiment, at least a one electron reduction of the oxidised form of the mediator, such as a polyoxometallate, yields the reduced form. In one embodiment at least a two electron reduction of the oxidised form yields the reduced form. Such a mediator is beneficial as it has a higher electron accepting and donating density. Thus one cluster molecule may "hold" two or more electrons.

In one embodiment, the reduction or oxidation of the mediator, such as a polyoxometallate, may be associated with the gain or loss of $H^+$ from or to the mediator. Here, the mediator is a $H^+$ donor and/or acceptor. In one embodiment, the reduction or oxidation is associated with the gain or loss of two or more $H^+$ from or to the mediator. Such a mediator is beneficial as it has a higher proton accepting and donating density. Thus a mediator such as a polyoxometallate cluster or a quinone compound may "hold" two or more protons. As explained below, a mediator that is capable of donating and accepting $H^+$ may act as a buffering agent in the electrolyte during the electrochemical reaction.

In one embodiment, the mediator is a proton and electron donor and acceptor. Here, the mediator may be referred to as a proton electron buffer (PEB).

The ability of a mediator to accept or donate protons provides a useful benefit in the systems and methods of the invention. The mediator has the ability to act as a pH buffer to the electrolyte by accepting protons that are generated in an oxygen production method. Conversely, as protons are consumed in a hydrogen generation method, the mediator is capable of donating protons to the system.

Advantageously, some of the mediators described herein can function as a donor, acceptor and store for both electrons and protons. In some embodiment, the mediator may serve as a donor, acceptor and store for electrons. The source of protons for the reduction reaction that yields hydrogen may be provided by a source other than the mediator. Suitable electrolyte or compositions may be provided for this purpose. In one embodiment, a buffer is provided to accept and donate protons as appropriate.

The reduced and oxidized forms of the mediator are soluble in water, and are soluble in acidified water. Thus, oxidation or reduction of the mediator does not produce an insoluble material within an electrochemical cell or a composition.

The mediator may be an anion. The charge of the oxidised state of the mediator is −1 or less, for example −2, −3, −4. In one embodiment, the oxidised state has a charge of −3.

In one embodiment, the charge of the reduced state of the mediator is 1 or more less than the charge of the oxidised stated of the mediator, for example, 2 more, or 3 more. Thus, where the oxidised state has a charge of −3, the reduced state may have a charge of −5.

In one embodiment, the reduced state has a charge of −5.

In one embodiment, the mediator has a reversible redox wave, such as a 2 electron wave, at potentials between the onset of the oxygen evolution reaction (OER) and the hydrogen evolution reaction (HER).

In one embodiment, the mediator has a reversible redox wave lying in the range +0.3 to +0.9 V vs NHE. The reduction peak may a one, two, or multi-electroredox wave. In one embodiment, the redox wave lies in the range +0.4 to +0.8 V vs NHE, or in the range +0.5 to +0.7 V vs NHE. The reversible redox wave may be determined experimental using, for example, cyclic voltammetry experiments, as known to a person of skill in the art. The potentials mentioned here may refer to the potentials measured with the mediator in an electrolyte having a pH in the range 0 to 3, such as 1 to 2.

The location of the mediator reduction peak or peaks may be determined using cyclic voltammetry, as will be familiar on of skill in the art. The potentials may be expressed in relation to the NHE.

The values for the location of a mediator reduction wave may be determined for an acidic solution of the mediator, for example at a pH of about 0.3.

In one embodiment, the mediator exists in two oxidation states only with the range of potentials between the onset of the oxygen evolution reaction (OER) and the hydrogen evolution reaction (HER).

In one embodiment, the oxidation of a mediator at a potential between the onset of the oxygen evolution reaction (OER) and the hydrogen evolution reaction (HER) leads to a single oxidised product. Within the same range of potentials, the oxidised mediator is preferably not further oxidised.

In one embodiment, the reduction of a mediator at a potential between the onset of the oxygen evolution reaction (OER) and the hydrogen evolution reaction (HER) leads to a single reduced product. Within the same range of potentials, the reduced mediator is preferably not further reduced.

In one embodiment, the mediator is used in an electrolyte having a pH that is at most 6, at most 5, at most 4, at most 3, or at most 2.

In one embodiment, the mediator is used in an electrolyte having a pH that is at least 0.1, at least 0.2 or at least 0.3.

In one embodiment, the mediator is used in an electrolyte having a pH that is in a range having upper and lower values selected from the values above.

In one embodiment, the mediator is a buffering agent. Thus, in use, the mediator is suitable for accepting and donating protons. In use, the mediator may substantially maintain the pH of the electrolyte solution during an electrochemical reaction. As noted above, the mediators described herein can function as a donor, acceptor and store for both electrons and protons. The present inventors have established that the hydrogen and/or oxygen evolution reactions are optionally performed under conditions where the electrolyte is buffered, for example by the mediator itself.

The mediator may be coloured i.e. the mediator may absorb light in the visible spectrum.

In one embodiment, the reduced and oxidised forms of the mediator are different colors. Such a change is a useful feature of certain mediators, such as polyoxometallates. As the amount of oxidised or reduced mediator increases, the color of the electrolyte may change. The changes in electrolyte color may be a useful indicator of reaction progress, and mediator conversion with the electrolyte. Furthermore, in some embodiments of the invention, the mediator is retained by a membrane to a working electrode part of the electrolyte space. If there is deterioration in the integrity of the membrane, such that the mediator is able to move into the counter electrode region of the electrolyte space, this may be readily detected by the operator as a change in, or the appearance of, color in the electrolyte within the counter electrode region.

In one embodiment, the mediator has at least 10 atoms, at least 15 atoms or at least 20 atoms.

In one embodiment, the mediator has at least 3 oxygen atoms, at least 4 oxygen atoms, or at least five oxygen atoms.

In one embodiment, the mediator has a molecular weight of at least 100, at least 150, at least 200, or at least 500.

In one embodiment, the mediator does not contain an Fe atom. In one embodiment, the mediator does not contain an I atom.

In one embodiment the mediator is an anion that may be protonated to give a neutral product. That neutral product may be a liquid or a solid at standard pressure and temperature (STP; 15° C., 101.325 kPa).

As noted above, the mediator may be a polyoxometallate.

In one embodiment, the polyoxometallate comprises at least 2, 3, 6, 7, 12, 18, 24, 30 or 132 metal atoms.

In one embodiment, the polyoxometallate comprises 2, 3, 6, 7, 12, 18, 24, 30 or 132 metal atoms.

In one embodiment, the polyoxometallate comprises 6, 7, 12, 18, 30 or 132 metal atoms.

The number of oxygen atoms is determined by the number of metal atoms present in the polyoxometallate, and the particular structure adopted by the cluster.

In one embodiment, the polyoxometallate has 12 metal atoms. In this embodiment, the cluster may comprise 40 oxygen atoms.

In one embodiment, the polyoxometallate has 18 metal atoms. In this embodiment, the cluster may comprise 54 oxygen atoms.

The polyoxometallate may have a major metal atom component and one or more further heteroatom components selected from P, Si, S, Ge, W, V, Mo, Mn, Se, Te, As, Sb, Sn, and Ti.

The polyoxometallate may have a major metal atom component and one or more further heteroatom components selected from W, V, Mo, Nb, Ti, V, Cr, Mn, Fe, Co, Ni, Cu, Zn, Sn, Pb, Al, and Hg.

In one embodiment, the metal atoms in the polyoxometallate are selected from the group consisting of W, Mo, V and Nb, and combinations thereof.

In one embodiment the metal atoms in the polyoxometallate are selected from the group consisting of Mo and V, and combinations thereof.

In one embodiment the metal atoms in the polyoxometallate are Mo atoms.

In addition to any of the W, Mo, V and/or Nb atoms present, the polyoxometallate may further comprise Ti, V, Cr, Mn, Fe, Co, Ni, Cu, and/or Zn.

In addition to any of the W, Mo, V and/or Nb atoms present, the polyoxometallate may further comprise Sn, Pb, Al, and/or Hg.

Polyoxometallates of the type described above are particularly favored in view of the fact that they consist of earth-abundant elements.

In one embodiment, the polyoxometalate is of formula $[M_{12}O_{40}X]^{n-}$ where M is a metal, such as Mo, W or V, or mixtures thereof, X is P or S, and n is 3, 4, 5 or 6 as appropriate.

In one embodiment, the polyoxometallate is of formula $H_mM_{12}O_{40}X$ where m is 3, 4, 5 or 6 as appropriate, M is a metal, such as Mo, W or V, or mixtures thereof, and X is P or Si.

The metal atoms in the polyoxometallate may be the same or different. Typically, the metal atoms are the same.

In one embodiment, the mediator is $[Mo_{12}PO_{40}]^{3-}$ or $[Mo_{12}PO_{40}]^{5-}$, and the acidic forms thereof, for example $H_3Mo_{12}PO_{40}$ or $H_5Mo_{12}PO_{40}$. $[Mo_{12}PO_{40}]^{3-}$ and $[Mo_{12}PO_{40}]_{5-}$ (and the acid forms thereof) may be used as a redox couple. Thus, the former may be readily converted to the latter and vice verse. The former may be referred to as a reduced polyoxometallate and the latter as an oxidised polyoxometallate, as context dictates. $H_3Mo_{12}PO_{40}$ is $(H_3O^-)[H_2Mo_{12}PO_{40}]^-$ at pH 0.3.

Phosphomolybdic acid is well-suited to the role of a mediator for water splitting for several reasons: it is highly soluble in water at room temperature (allowing high concentrations to be accessed), it is commercially available in a form where the only counter-cation is $H^+$, it contains no easily oxidised moieties which might decompose during electrolysis, it has several reversible 2-electron waves at potentials between the onset of the oxygen and hydrogen evolutionary reaction, it accepts charge-balancing protons when it is reduced (hence it should buffer the solution pH during water splitting), it is known to be compositionally stable within the pH range studied (see Tsigdinos et al.), and the 2-electron reduced form, $(H_3O^+)[H_4Mo_{12}PO_{40}]^-$, reacts only slowly with oxygen in the air at room temperature i.e. both the oxidised and first reduced forms should be stable under ambient conditions.

In one embodiment, the mediator is a quinone compound. The quinone compound comprises a benzoquinone group, which may be a 1,4-benzoquinone group or a 1,2-benzoquinone group. A 1,4-benzoquinone group is preferred. Examples of compounds having a 1,4-benzoquinone group present include.

The quinone compound may be anionic, for example in both its oxidised and reduced forms. The quinone compound may include anionic functionality, for example sulphate or carboxylate functionality.

A reference to a quinone compound includes a reference to a compound having a 1,4-dihydrobenzene or a 1,2-dihydrobenzene group, as appropriate. Thus, in an oxygen generating reaction, a quinone compound is reduced to the dihydrobenzene form. In a hydrogen generating reaction, a dihydrobenzene compound is oxidised to the quinone form.

The quinone compound may include functional groups, such as hydroxyl, amino, carboxy, sulphate, and poly(alkyleneglycol) groups, which may solubilise the compound in an aqueous electrolyte.

The present inventors have determined that mediators, such as polyoxometallate and quinone compounds, for use in the present invention do not cause degradation of the membrane. The inventors have established that the membrane remains intact after at least five weeks' exposure to a polyoxometallate in an aqueous electrolyte solution.

The oxidation and reduction of polyoxometallates may be accompanied by a colour change. The change in colour is associated with the appearance/disappearance of absorption bands associated with for example, intervalance charge transfer between metals of different oxidation sates within a cluster.

Polyoxometallates are available commercially or may be prepared as required using standard techniques, such as those described by G. A. Tsigdinos, *Ind. Eng. Chem., Prod. Res. Develop.* 13, 267 (1974). The preparation, identification and use of other polyoxometallate structures are usefully reviewed in Long et al.

Quinone compounds are readily available from commercial sources, and may be prepared using standard techniques know to those of skill in the art.

Electrodes

Electrodes for use in systems for the generation of hydrogen and/or oxygen are well described in the art (see, for example, Damjanovic et al. as an early example). The electrodes for use in the present invention include those comprising or consisting of platinum, platinum oxide, palladium, iridium, iridium oxide, indium-tin oxide and/or carbon and tungsten trioxide.

Other electrodes are also suitable for use, although preferably such should be resistant to strong acid. The choice of electrode is dependent on the nature of the hydrogen or oxygen generation method. Thus, as described herein, there are provided methods for the photo electrochemical generation of hydrogen and oxygen. Such methods may call for the use of a semi-conductor type electrode, or an electrode having a coating of a photo catalyst.

Typically, the electrodes of the Invention do not contain Fe. The use of iron-containing electrodes, such as stainless steel electrodes, has been associated with the loss of membrane integrity in (see Pozio et al.). The methods described herein may also include the use of acidified electrolyte, for example at a pH of between 0 and 2. The electrodes selected for use should therefore be substantially resistant to acid degradation.

A working electrode, as described herein, is an electrode at which a mediator is oxidised or reduced. A counter electrode, as described herein, is an electrode at which hydrogen or oxygen may be generated.

The working electrode may be a cathode in those methods where the mediator is reduced. The working electrode may be an anode in those methods where the mediator is oxidised.

In one embodiment of the invention, the working electrode is a platinum or platinum-containing electrode. Alternatively, the working electrode may be a carbon electrode. In one embodiment of the invention, the counter electrode is a platinum or platinum-containing electrode. In these embodiments the power source for the electrochemical reaction is provided by an external source.

The electrode material may be selected for its suitability in the oxygen evolving reaction or the hydrogen evolving reaction. For example, platinum is particularly suitable for use at a cathode for the hydrogen evolving reaction. Iridium or iridium oxide is particularly suitable for use at an anode for the oxygen evolving reaction. Alternatively, the electrode for the oxygen and hydrogen evolving steps may be the same. For example, the electrode may be platinum in these circumstances.

In one embodiment of the invention there is provided a method for the separate (non-simultaneous) generation of oxygen and hydrogen. In this method, the electrochemical cell used for the generation of these products may be the same. The counter electrode for the generation of oxygen and hydrogen is the same electrode. A reverse in the applied bias changes the counter electrode from a cathode to an anode (or vice versa) as appropriate. It is an advantage of the present system that the same electrochemical cell may be used to generate hydrogen and oxygen at separate times, and without the need for complicated alterations to the cell set up.

The use of an electrode that does not contain a metal such as platinum is advantageous in that it minimises apparatus costs. However, there may be electrochemical benefits associated with the use of platinum and other such electrodes. These benefits, which can include greater power efficiencies, may provide an overall more efficient system. Thus, the electrode may be selected with a view to the wider benefits that result from its use and not merely the costs of preparing the electrode. Such considerations will be apparent to one of skill in the art.

The working or counter electrode may be in the form of a wire, sheet (or foil), or mesh.

In another embodiment, the counter electrode is a photovoltaic electrode. Thus, the electrode is or comprises material that is photo reactive. This material may be referred to as a photo catalyst. Illumination of the electrode with light of an appropriate wavelength produces free charge carriers, electrons and holes, in the photo reactive material. In the present invention, the electrodes absorb visible (400 to 750 nm) or ultraviolet (10 to 400 nm) light. Thus, the electrodes may be used together with incident sun light to generate electrochemical changes.

Many photoreactive materials for use in photoanode and photocathode electrodes are known, and are discussed in Walter et al.

The choice of photoreactive material may be based on the role of the counter electrode in the electrochemical cell. A counter electrode that acts as an oxygen evolution photocatalyst may be selected on the basis of the energy levels of the conduction and valence bands. These bands may be located advantageously relative to the water oxidation potential. Similarly, a counter electrode that acts as a hydrogen evolution photocatalyst may be selected on the basis of the energy levels of the conduction and valence bands. These bands may be located advantageously relative to the proton reduction potential.

For example, a $WO_3$ photocatalyst may be used for oxygen evolution and suitably modified $TiO_2$ may be used for hydrogen evolution (as reviewed by Grätzel).

In one embodiment, the working electrode comprises $WO_3$, optionally together with other components. The other components may be metals or metal oxides or metal nitrides (amongst others), and are added to increase the overall conversion efficiency of the photocatalyst.

A photocatalyst may be present as an outer layer of an electrode. In one embodiment, the photocatalyst is provided on an electrically conductive transparent substrate. Transparency may refer to visible and/or UV light transparency. In one embodiment, the substrate is an Indium-tin oxide (ITO) substrate. Such an electrode is suitable for use as an anode in an oxygen generating step.

A reference electrode may be included in the electrode cell of the invention. The reference electrode may be a standard silver/silver chloride electrode. The reference electrode may be a pseudo reference electrode, which is operable as a reference electrode in the presence of a suitable buffer comprising appropriate ions.

The working electrode and the counter electrode, along with the reference electrode define an electrolyte space. In use, the electrodes are in electrical contact with an electrolyte in said electrolyte space. The electrolyte is as described herein.

Electrochemical Cell

In one aspect of the invention there is provided an electrochemical cell comprising a working electrode, a counter electrode, optionally a reference electrode and an electrolyte. The electrolyte comprises a mediator, as described herein. The counter electrode and the working electrode are suitable for electrical connection or are electrically connected.

The working and counter electrodes define an electrochemical space in which an electrolyte is provided. In one embodiment, the electrochemical space is divided by a semi-permeable membrane to provide a working electrode electrolyte space and a counter electrode electrolyte space. The mediator is provided in the working electrode electrolyte space. No mediator is provided in the counter electrode space. The semi-permeable membrane prevents movement of the mediator (in either the oxidised or reduced form) from moving from the working electrode electrolyte space to the counter electrode electrolyte space. The mediator is thereby prevented from contacting the counter electrode surface.

A set up whereby the mediator is separated from the counter electrode side of the cell is advantageous in that the mediator cannot interfere with the chemistries that are occurring at the counter electrode. In those cells that are based on the photoelectrochemical generation of hydrogen and/or oxygen, the mediator is kept separate from the side of the electrolyte space where the photochemistry occurs. The mediator may absorb light at wavelengths that overlap with the wavelengths at which the photocatalyst absorbs light. Thus, the mediator is prevented from interfering with the photochemistry.

In some embodiments of the invention the wavelengths at which the mediator absorbs light may be sufficiently different from the wavelengths at which the photocatalyst absorbs light. Here it may not be necessary to retain the mediator at the working electrode side of the cell. However, the present inventors prefer to prevent the mediator from contacting the counter electrode, in order to limit cross-reactions in the system.

The working and counter electrodes are electrically connected or connectable.

In one embodiment the electrochemical cell may further comprise a voltage supply (or power supply). The voltage supply is preferably adapted to supply a constant bias between the working electrode and the counter electrode or the reference electrode, where present. The voltage supply is adapted to supply a constant bias of up to 2.0 V. In one embodiment, the voltage supply is adapted to supply a constant bias of around 1.0 V. The voltage supply is reversible as required.

In one embodiment the electrochemical cell derives its power from an external light source, and in particular sunlight. In one embodiment, the electrodes are in electrical connection with, for example, a photovoltaic device. In another embodiment, the counter electrode is provided with a light activateable material suitable for use in an electrochemical cell. Such electrodes are as described above.

The electrochemical cell may further comprise a detector for monitoring current.

The electrochemical cell may further comprise a controller for controlling the voltage supply and timing of that supply.

Electrolyte

The present invention relates to the generation of oxygen and/or hydrogen from water using a mediator. Thus, the electrolyte is an aqueous electrolyte.

The electrolyte comprises the mediator. The mediator may be present at a concentration of at most 1.0, at most 1.5, or at most 2.0 M.

The mediator may be present at a concentration of at least 0.1, at least 0.2 or at least 0.3, or at least 0.5 M.

The mediator may be present at a concentration in a range selected from the upper and lower values given above, for example 0.5 to 2.0 M.

In one embodiment, the mediator is present at a concentration of about 0.5 M.

In one embodiment, the concentration refers to the concentration of the mediator in the working electrode space of the electrolyte space.

In principle water electrolysis may be performed at any pH: under very basic or acidic conditions, or at neutral pH. Of these, the latter two approaches are suitable for the environment within a proton exchange membrane electrolyser (PEME), whereby water is oxidised at the anode to give protons and oxygen and protons and electrons combine at the cathode to give hydrogen. The advantages of a PEME over a high pH alkaline electrolyser are increased current densities (~2 $Acm^{-2}$ for a PEME vs. ~0.2 $Acm^{-2}$ for a typical alkaline electrolyser), a wide possible range of power loadings (making PEMEs useful over a wide range input powers), and fast power-up/power-down rates, which make PEMEs highly responsive to changes in power input. Moreover, PEMEs tend to be more efficient (and hence use less electricity per volume of hydrogen produced) than their alkaline counterparts. These factors combine to make PEMEs ideally suited for applications where the power input is variable in terms of power and/or duration, such as the intermittent energy supplied by renewable sources (see Kanan et al. Atlam, Paul et al.).

The electrolyte may be acidic. In one embodiment the electrolyte has a pH of at most 6, at most 5, at most 4, at most 3 or at most 2.

In one embodiment, the electrolyte used in the electrochemical reaction has a pH that is at most 6, at most 5, at most 4, at most 3, or at most 2.

In one embodiment, the electrolyte has a pH that is at least 0.1, at least 0.2 or at least 0.3.

In one embodiment, the electrolyte has a pH that is in a range having upper and lower values selected from the values above.

In one embodiment the pH of the electrolyte is in the range 0 to 2.

In one embodiment, the pH of the electrolyte is about 0 or about 1.

An electrolyte that has a substantially neutral pH may also be used.

In one embodiment, the electrolyte is an aqueous $H_3PO_4$ solution.

In one embodiment, the electrolyte is an aqueous 1.0 M $H_3PO_4$ solution.

The pH of the electrolyte may refer to the pH before the electrochemistry has been initiated i.e. before hydrogen or oxygen generation has begun. Alternatively, the pH may refer to the pH of the electrolyte during the hydrogen or oxygen generation process.

The electrolyte may be buffered. A buffer is provided to maintain the pH of the electrolyte through out the electrochemical process. The present inventors have discovered that the mediator itself may act to buffer the electrolyte. As described herein, the mediator may accept and donate protons, thereby controlling the pH of the electrolyte solution.

In one embodiment, the buffer is suitable for maintaining the pH of the electrolyte solution at a substantially constant level during an electrochemical reaction. The mediator itself may fulfil this function, for example where the mediator is capable of donating and accepting protons. In one embodiment, the change in pH of the electrolyte during an electrochemical reaction may be less than 1 unit, less than 0.5 units, less than 0.3 units, less than 0.2 units or less than 0.1 units of pH.

As described herein, the electrochemical cell of the invention comprises an electrolyte space. The space is divided into a working electrode region and a counter electrode region by a membrane. The membrane prevents movement of the mediator, in its oxidised and reduced form, from one side of the electrolyte region to another. Thus, it will be appreciated that the composition of the electrolyte in one electrolyte region will differ to the composition of the electrolyte space in the other region.

Methods for the preparation of the electrolyte will be obvious to one of skill in the art.

Membrane

A membrane is provided to prevent the movement of the mediator from the working electrode side of the electrochemical cell (the working electrode electrolyte space) to the counter electrode side of the electrochemical cell (the counter electrode electrolyte space). The membrane permits movement of other ions, such as protons, from moving the working electrode electrolyte space to the counter electrode electrolyte space, and vice versa.

In one embodiment, the membrane is a cationic permeable membrane. In one embodiment, the membrane is a proton permeable membrane.

In one embodiment, the membrane is a membrane that is impermeable to molecules having a molecular weight of 200 or more, 500 or more, or 1,000 or more.

The membrane is not particularly limited so long as the membrane is capable of preventing movement of the mediator there through, whilst permitting movement of cations, particularly protons there through. The membrane may therefore said to be impermeable to the mediator.

Suitable for use in the present case are membranes containing a sulfonated tetrafluoroethylene based fluoropolymer-copolymer. Nafion membranes are examples of commercially available membranes of this type.

In one embodiment, the membrane is a cellulose membrane, which includes functionalised cellulose membranes. In one embodiment the membrane is a benzoylated cellulose-membrane.

At high voltages, a membrane material is at risk of degradation. The present invention provides for the use of relatively low voltages, thereby minimising the likelihood that the membrane material will degrade. The use of iron-containing electrodes has been associated with a loss of membrane integrity over time. Therefore, the use of iron-containing electrodes is avoided in the electrochemical cells described here, as appropriate.

Use of a Mediator

In one aspect of the invention there is a provided a mediator, as described herein, as a store for $e^-$ in an electrochemical cell, such as a cell described herein. The mediator, such as polyoxometallate, is suitable for reversibly storing $e^-$. The mediator, such as polyoxometalate, is therefore an $e^-$ acceptor and an $e^-$ donor. In one embodiment, the mediator, as described herein, as a store for $e^-$ and $H^+$ in an electrochemical cell, such as a cell described herein. The mediator, such as polyoxometallate, is suitable for reversibly storing $H^+$ and $e^-$. The mediator, such as polyoxometallate, is therefore an $H^+$ and $e^-$ acceptor and an $H^+$ and $e^-$ donor. More generally, the mediator may act as a donor or acceptor of electrons, optionally together with $H^+$, in methods for the production of hydrogen an/or oxygen from water.

The mediator, such as polyoxometallate may be reduced in combination with another half reaction, where another species is oxidised, as appropriate. The suitably reduced mediator, such as reduced polyoxometallate may then be oxidised (which may occur separately in time and space to the initial reduction) in combination with another half reaction, where another species in reduced, as appropriate. Similarly, the mediator, such as polyoxometallate may be oxidised in combination with another half reaction, where another species is reduced, as appropriate. The suitably oxidised mediator, such as oxidised polyoxometallate may then be reduced (which may occur separately in time and space to the initial oxidation) in combination with another half reaction, where another species in oxidised, as appropriate.

In the present invention the other half reactions relate to the generation of hydrogen and oxygen from water. Thus, where the another species is reduced, this is a reference to the reduction of protons to yield hydrogen. Accordingly, where the another species is oxidised, this is a reference to the oxidation of water to yield oxygen (together with protons).

The mediator may be used in an electrochemical cell to generate hydrogen and/or oxygen from water. The mediator may also be used in combination with photoactive catalysts for the same purpose.

As noted above, Itagaki et al. describe the use of a polyoxometallate, together with another metallic species (e.g. Pt), as a storage medium for hydrogen. The use of the polyoxometallates herein may be contrasted with the use described by Itagaki et al. The prior art describes the polyoxometallate as accepting and donating hydrogen. The authors note that the form in which the hydrogen is stored is as a proton and an electron. The authors speculate that the hydrogen dissociates on the other species, and the proton and the electron diffuse into the bulk of the polyoxometallate. This document does not describe the use of a polyoxometallate in an electrochemical cell to directly accept and donate electrons and protons. Rather, Itagaki et al. relies on the presence of an incorporated metal to disassociate hydrogen into proton and electron. The document does not teach the use of hydrogen generation from water.

In a further aspect of the invention there is a provided a mediator, as described herein, as a store for $H^+$ or $e^-$ in a composition comprising a photo catalyst, such as a cell described herein.

Methods for Hydrogen Generation

The present invention provides methods for the generation of hydrogen from protons using a mediator, such as polyoxometallate, which is oxidised in the process.

In one aspect of the invention, there is provided a method for the generation of hydrogen, the method comprising the step of oxidising a mediator, such as polyoxometallate at a working electrode to yield an oxidised mediator, such as oxidised polyoxometalate, and reducing protons at a counter electrode to yield hydrogen. The yield of hydrogen, with reference to the amount of electrons passed through the system, is extremely high, and the Faradaic efficiency) may be at least 90%, at least 95% or substantially 100%.

In one embodiment, the mediator (in either reduced or oxidised form) is prevented from contacting the counter electrode. A semi-permeable membrane, such as described herein, may be provided for this purpose.

The method comprises the steps of reducing protons to generate hydrogen and oxidizing a mediator (which may be a reduced mediator) to generate an oxidised mediator.

The method comprises the step of providing and maintaining a potential across the working electrode and the counter electrode and/or the reference electrode, where present.

In one embodiment the potential applied between the working and counter electrodes is at most 2.0 V, is most 1.5 V, is at most 1.3 V, is at most 1.2 V. is at most 1.1 V. For the avoidance of doubt, in the hydrogen generation step, the working electrode is an anode and the counter electrode is the cathode.

In one embodiment, the potential applied between the working and counter electrodes is about 1.0 V.

In one embodiment, the electrolyte used in the electrochemical reaction has a pH that is at most 6, at most 5, at most 4, at most 3, or at most 2.

In one embodiment, the electrolyte has a pH that is at least 0.1, at least 0.2 or at least 0.3.

In one embodiment, the electrolyte has a pH that is in a range having upper and lower values selected from the values above.

In one embodiment, the pH of the electrolyte solution is maintained at a substantially constant level during the electrochemical reaction. Thus, the electrolyte may be buffered. The mediator itself may fulfil this function, for example where the mediator is capable of donating and accepting protons.

In one embodiment, the change in pH of the electrolyte during the hydrogen generation may be less than 1 unit, less than 0.5 units, less than 0.3 units, less than 0.2 units or less than 0.1 units of pH.

In one embodiment, a photo catalyst may be provided at the counter electrode, which photo catalyst catalyses the generation of hydrogen upon illumination. Illumination may refer to the exposure of the cell to a light source, such as sunlight.

After the reaction is complete, the oxidised mediator may be recovered. The oxidised mediator may be reduced to obtain (reduced) mediator, which can be used in further hydrogen production methods. The oxidised mediator may be reduced using electrochemical techniques. In one embodiment, the mediator is reduced in an oxygen production method. Thus, the recycling of the mediator may be linked to the production of a useful product i.e. oxygen.

The hydrogen generated may be collected, and optionally pressurized, for storage and future use. Suitable containers are well known in the art.

Hydrogen presence and yields may be determined using standard analytical techniques.

Methods for Oxygen Generation

In one aspect the present invention provides a method for the electrochemical generation of oxygen.

The method comprises the steps of oxidising water to generate oxygen and reducing a mediator (which may be an oxidised mediator) to generate a reduced mediator. The yield of oxygen, with reference to the amount of electrons passed through the system, is extremely high, and the Faradaic efficiency) may be at least 90%, at least 95% or substantially 100%.

In one embodiment, the mediator (in either reduced or oxidised form) is prevented from contacting the counter electrode. A semi-permeable membrane, such as described herein, may be provided for this purpose.

In one embodiment the potential applied between the working and counter electrodes is at most −2.0 V, is most −1.5 V, is at most, −1.3 V, is at most, −1.2 V. is at most −1.1 V. For the avoidance of doubt, in the oxygen generation step, the working electrode is the cathode and the counter electrode is the anode. Thus, by convention, the voltages are expressed in negative terms.

In one embodiment, the potential applied between the working and counter electrodes is about −1.0 V.

In one embodiment, the electrolyte used in the electrochemical reaction has a pH that is at most 6, at most 5, at most 4, at most 3, or at most 2.

In one embodiment, the electrolyte has a pH that is at least 0.1, at least 0.2 or at least 0.3.

In one embodiment, the electrolyte has a pH that is in a range having upper and lower values selected from the values above.

In one embodiment, the pH of the electrolyte solution is maintained at a substantially constant level during the electrochemical reaction. Thus, the electrolyte may be buffered. The mediator itself may fulfil this function, for example where the mediator is capable of donating and accepting protons.

In one embodiment, the change in pH of the electrolyte during the oxygen generation may be less than 1 unit, less than 0.5 units, less than 0.3 units, less than 0.2 units or less than 0.1 units of pH.

In one embodiment, a photo catalyst may be provided at the counter electrode, which photo catalyst catalyses the generation of oxygen upon illumination. Illumination may refer to the exposure of the cell to a light source, such as sunlight.

After the reaction is complete, the reduced mediator may be recovered. The reduced mediator may be oxidised to obtain (oxidised) mediator, which can be used in further oxygen production methods. The reduced mediator may be oxidised using electrochemical techniques. In one embodiment, the mediator is oxidised in a hydrogen production method. Thus, the recycling of the mediator may be linked to the production of a useful product i.e. hydrogen.

The oxygen generated may be collected, and optionally pressurized, for storage and future use. Suitable containers are well known in the art.

Oxygen presence and yields may be determined using standard analytical techniques, including fluorescence spectroscopy.

Methods for Hydrogen and Oxygen Generation

The present invention provides independent methods for the generation of hydrogen and the generation of oxygen. Each of these methods may be used together to produce both hydrogen and oxygen.

In one embodiment, the methods of the first and the second aspects of the invention (which methods are described above) are used to provide a method for the generation of hydrogen and oxygen. Here, the hydrogen production step may not be performed simultaneously to the oxygen production step. Thus, the hydrogen and oxygen steps may be referred to as decoupled. Thus, two smaller energy inputs are used to split water to give hydrogen and oxygen at different times, as opposed to a single energy input which produces hydrogen and oxygen simultaneously.

Whilst natural photosynthetic systems are able to achieve an analogous feat on the molecular level (and whilst some thermochemical cycles which rely on harsh reaction conditions may produce hydrogen and oxygen from water at separate times on a large scale—see Funk et al. and Onuki et al.), the present provides a general and scalable electrolytic system for the temporally separate oxygen and hydrogen evolution reactions.

Thus, in a method for producing hydrogen and oxygen, the method comprises the steps of:

(i) oxidising a mediator at a working electrode to yield an oxidised mediator, and reducing protons at a counter electrode to yield hydrogen; and (ii) reducing an oxidised mediator at a working electrode to yield a mediator, and oxidising water at a counter electrode to yield oxygen.

wherein the oxygen generation step is performed non-simultaneously to the hydrogen generation step, and the oxidised mediator of step (i) is used as the oxidised mediator of step (ii), or the mediator of step (ii) is used as the mediator of step (i). So, the mediator that is used in step (i) is produced in step (ii) or the oxidised mediator used in step (ii) may be produced in step (i).

In one embodiment, the mediator has a reversible redox wave lying between the onset of the oxygen evolution reaction (OER) and the hydrogen evolution reaction (HER)
In one embodiment, the mediator has a reversible redox wave lying in the range +0.3 to +0.9 V vs NHE.
In one embodiment, the mediator and the oxidised mediator are prevented from contacting the counter electrode
In one embodiment, the mediator is provided in an electrolyte, and the pH of the electrolyte remains substantially constant throughout step (i) and/or step (ii).

In an alternative method, the method of hydrogen generation according to the present invention may be used in combination with a known oxygen generation method. In another embodiment, the method of oxygen generation of the invention may be used in combination with a known hydrogen generation method. These two alternative methods are less preferred, as the mediator is not necessarily recycled during the oxygen and hydrogen production process. Instead, the mediator may need to be recycled separately, if it is to be reused in a hydrogen or oxygen production step.

The separate recycling of mediator species is described by Miseki et al., amongst others.

Thus, the key to the generation of hydrogen and oxygen using a favored method of the invention is the mediator which acts as an electron and a proton source and donor.

The present invention provides the advantage that the hydrogen and oxygen generation steps may be separated in time and/or space. Thus, for example, hydrogen may be generated with concomitant oxidation of a mediator. Later, the same oxidised mediator may be used in a method to generate oxygen. Either the oxygen generation step or the hydrogen generation step may be performed first, if the reactions are to be run separately.

The advantage of running the hydrogen and oxygen generation steps independently (in time or space) is that the product gases may be collected independently, without any requirement for a separation step. For the avoidance of doubt it is noted that the oxygen producing may be performed before or after the hydrogen evolving step. The initial step may be selected based on the availability of the mediator in a particular oxidation step, which may favor a reduction or oxidation reaction first.

Accordingly, in one embodiment, the hydrogen and oxygen producing steps are performed non-simultaneously (i.e. separately in time). Such a method follows inevitably from the use of the mediator as an electron and proton acceptor and donor. Only once the mediator is converted to its reduced form may it be used as an electron and proton donor. Likewise, only once the mediator is converted to its oxidised form may it be used as an electron and proton acceptor.

The mediator which is oxidised or reduced in one generation step may be used in the other generation step, where it is reduced or oxidised accordingly, to yield the original mediator species. Thus, the mediator is recycled rather than consumed in the overall process.

The hydrogen and oxygen generation steps may be performed using the same electrochemical cell. Thus, once an oxygen generating step is complete and the mediator is suitably reduced, the bias across the working and counter electrodes may be reversed, thereby producing hydrogen with concomitant oxidation of the mediator (which is now converted to its original form prior to the oxygen generating step). After this sequence is complete, the oxygen and the hydrogen evolving steps may be repeated. The present inventors have repeated this cycle and with no obvious degradation of the mediator, the electrolyte or the cell components (e.g. the membrane or the electrodes). This recycling of components in this way is particularly suitable for the production of significant amounts of hydrogen and oxygen, and without complex adaptations to the electrochemical set up.

In one embodiment, both the hydrogen and oxygen preparation methods may depend on light activation of a photo catalyst. However, in other embodiments, only one of the methods may depend on light activation.

Compositions and Methods Using Those Compositions

In other aspects of the Invention there are provided compositions for use in the generation of hydrogen or oxygen. The compositions comprise mediators, as described herein, together with a photocatalyst. The photo catalyst may be a photocatalyst such as described above in relation to the use of photo catalyst materials for the counter electrodes.

In the aspects of the invention described above, the mediator is prevented from entering into a working electrode portion of the electrolyte space by a membrane. In the aspects described herein the mediator and a photoactive material are not separated.

In these embodiments, the choice of mediator, such as polyoxometallate, and/or the choice of photocatalyst will be such so as to minimise any overlap in the absorption wavelengths of the photocatalyst with the absorption wavelengths for the reduced and oxidised forms of the mediator.

The use of photocatalysts to generate oxygen and/or hydrogen from water is well described in the art. For example, Masead et al. describe the use of a $IO_3^-/I^-$ mediator with a Pt-loaded $WO_3$ photocatalyst in an oxygen evolution step, and a Pt-modified oxynitride photocatalyst in a hydrogen evolution step.

A further example, as described by Bamwenda et el., for the generation of oxygen from water uses $WO_3$, $CeO_2$ and $TiO_2$ with $Fe^{3+}$ or $Ce^{4+}$ as mediators (electron acceptors).

The present invention provides mediators, such as polyoxometallates, as an alternative to the electron acceptors that have previously been described in the art for use with a photocatalyst. Polyoxometaate compounds, for example, have suitable reduction/oxidation profiles and are inherently thermally and oxidatively stable. The physical properties of the polyoxometallate, such as absorption profile and reduction/oxidation profile, may also be tuned by appropriate changes in the composition of the polyoxometallate complex, such as the identity and number of metal atoms, the presence of heteroatoms, such as Si or P, amongst other changes. Thus, the properties of the polyoxometallate may be selected so as to provide the most appropriate electrochemical profile for use together with the photocatalyst. Such control is not possible where the mediator is simply a metal ion.

As described in the electrode section above, the photocatalyst material may be selected depending on whether the photocatalyst is to be used in an oxygen or hydrogen generating reaction.

In further aspects, the present invention provides a method for generating hydrogen, the method comprising the step of providing an aqueous mixture comprising a photocatalyst and a mediator as described herein, illuminating the mixture with light, thereby to oxidise the mediator, such as polyoxometallate, to yield an oxidised mediator, such as oxidised polyoxometallate, and thereby to reduce protons to yield hydrogen.

The present invention provides a method for generating oxygen, the method comprising the step of providing an aqueous mixture comprising a photocatalyst and a mediator as described herein, illuminating the mixture with light, thereby to reduce the mediator, such as polyoxometallate, to yield a reduced mediator, such as reduced polyoxometallate, and thereby to oxidise water to yield oxygen and protons.

Formally it will be appreciated that illumination of the photocatalyst with light generates an electron-hole pair. In the hydrogen generation method, the hole abstracts an electron from the mediator, such as polyoxometallate, and an electron is gained by a proton. In the oxygen generation method the hole abstracts an electron from water. The electron is gained by the mediator, such as polyoxometallate.

In one further aspect the methods for generating hydrogen and oxygen, as described above, may be combined in a single system photo electrochemical system. Such a method may be referred to as a Z scheme. Such a method, using $IO_3^-/I^-$ as a mediator couple is describe by Maeda et al.

The oxygen and hydrogen generated may be collected, separated, and optionally pressurized, for storage and future use. Suitable containers are well known in the art.

General Methods

Described above are methods for the generation of hydrogen and/or oxygen. The reactions are based on the presence of an aqueous composition, referred to as an electrolyte or a composition depending on the various aspects. This composition comprises a mediator. The methods may be conducted at ambient temperature (approx 20° C.) and at ambient pressure (approx. 101.325 kPa). The worked examples that are provided herein are conducted under such conditions.

It will be apparent to one of skill in the art that the methods of the invention may be conducted at higher temperatures or lower temperatures. Changes in temperature may be associated in higher electrochemical efficiencies and reaction yields.

In one embodiment, the reaction temperature is in the range 5 to 60° C.

In one embodiment, the reaction temperature is in the range 10 to 40° C.

In one embodiment, the reaction temperature is in the range 15 to 35° C.

Likewise changes in pressure may also be associated in higher yields, and may be useful to promote the evolution of hydrogen and/or oxygen from the composition. The use of higher pressures may also be advantageous as the gas produced would later need to be pressurised for storage purposes. Higher pressures are also associated with the formation of smaller gas bubbles, for example smaller bubbles of oxygen, within the composition (electrolyte or mixture), which is associated with greater reaction efficiencies.

Prior to the initiation of hydrogen and/or oxygen generating method, the composition (the mixture or the electrolyte) may be purged or evacuated in order to minimise or remove air within the system. The air may be replaced with argon, helium or nitrogen.

Other Preferences

Each and every compatible combination of the embodiments described above is explicitly disclosed herein, as if each and every combination was individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the figures described above.

EXAMPLES

The following examples are provided solely to illustrate the present invention and are not intended to limit the scope of the invention, as described herein.

Example Mediator and Use

Phosphomolybdic acid ($H_3Mo_{12}PO_{40}$), a commercially available polyoxometallate, was selected as a mediator for use in the exemplification of the present invention. The cyclic voltammogram (CV) of a 0.5 M aqueous solution of $H_3Mo_{12}PO_{40}$ (pH=0.3) at a Pt electrode is shown in FIG. 2 (all potentials vs. NHE).

Figure 2:
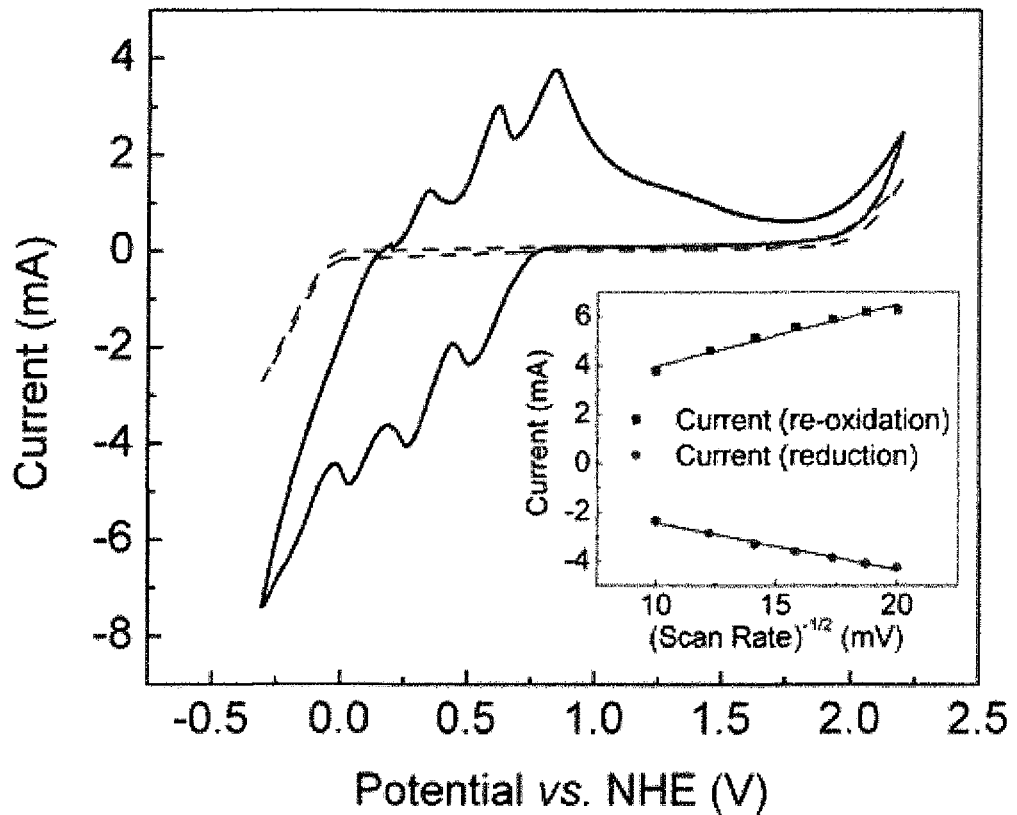
FIG. 2 is a graph of a cyclic voltammogram for a three-electrode, single compartment electrochemical setup with a 2 mm Pt working electrode, Pt wire counter electrode and Ag/AgCl reference electrode of 0.5 M $H_3Mo_{12}PO_{40}$ (solid line) and 1 M $H_3PO_4$ (pH=0.3, dashed line, from which the positions of the oxygen-evolving reaction and the hydrogen-evolving reaction onset are inferred). The graph inset shows the relationship between peak current and the square root of scan rate for the reduction and re-oxidation events of the reversible two-electron wave centred at +0.70 V over the scan rate range 100-400 mVs$^{-1}$. Linear fits are provided as a guide. Potentials were converted to a normal hydrogen electrode (NHE) potentials using the relationship E(NHE)=E(Ag/AgCl)+0.197 V.
Figure 3:
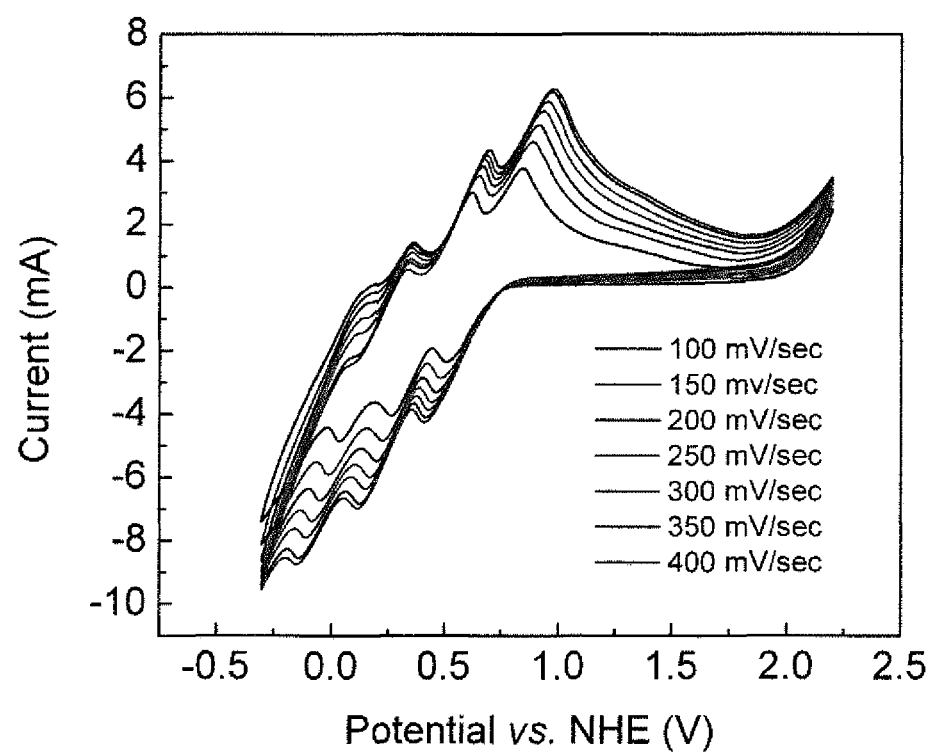
FIG. 3 is an overlay of the cyclic voltammograms for a three-electrode, single compartment electrochemical setup with a 2 mm Pt working electrode, Pt wire counter electrode and Ag/AgCl reference electrode of 0.5 M $H_3Mo_{12}PO_{40}$ at various scan rates. Recorded potentials were converted to a normal hydrogen electrode (NHE) potentials using the relationship E(NHE)=E(Ag/AgCl)+0.197 V. The scan rates for the upper lines are, from top to bottom, are 440, 35, 300, 250, 200, 150 and 100 mV/sec. This order is reversed for the lower lines, where the 100 mV/sec line is uppermost.

Highlighted in FIG. 2 are the reduction and oxidation waves of the reversible, 2-electron redox process of the PEB centred around +0.70 V. FIG. 2 (Inset) shows how the peak current for both the oxidation and reduction events associated with this wave vary with the square root of the scan rate: the linear trend observed indicates that both these processes are limited only by diffusion on a Pt electrode (see also FIG. 3). Based on the position of the OER catalytic wave (onset approx. +1.70 V in 1 M $H_3PO_4$, red dashed line in FIG. 2A: the concentration of $H_3PO_4$ was selected so that the pH was the same for all experiments) and the most positive potential necessary to still produce a two-electron reduction of $H_3Mo_{12}PO_{40}$ (+0.51 V, solid line), a potential difference of 1.19 V across the cell should be sufficient to drive simultaneous water oxidation and 2-electron PEB reduction. For the reverse process (cathodic $H^+$ reduction concomitant with 2-electron re-oxidation of the PEB at the anode), a potential difference of 0.86 V (0.84--0.02 V) is required. In contrast, FIG. 2 suggests that to drive simultaneous OER and HER without using the PEB, at least approx. 1.72 V (1.70--0.02 V) must be supplied.

To test this hypothesis, both chambers of an H-cell were charged with 1 M $H_3PO_4$ (pH=0.3), with a 50×30 mm area platinum foil electrode (effective area =3,000 mm², as both sides of the foil were exposed) in each chamber. These electrodes were then connected to a standard 3-electrode potentiostat as follows; one electrode functioned as the working electrode, whilst the other was connected to both the reference and counter electrode inputs on the potentiostat, giving a "floating reference electrode" configuration. This allowed us to monitor the current produced at fixed potential differences across the cell. The two chambers of the H-cell were separated by a thin Nafion membrane, so that cations (here only protons) could travel freely between compartments, but the movement of anions (especially the PEB anion, $[Mo_{12}PO_{40}]^{3-}$) was prohibited. Applying a potential of 1.8 V (working electrode held at −1.8 V vs. floating reference) across this cell produced a steady state current density of $6.0 \times 10^{-3}$ mAcm$^{-2}$ (FIG. 4), which increased to 0.13 mAcm$^{-2}$ at 3 V (see charge vs. time curves in FIG. 5). At this potential, GC-MS headspace analysis confirmed that both hydrogen and oxygen were formed; however, at lower potentials no $H_2$ or $O_2$ was detected (see FIGS. 4 and 5).

Figure 4:
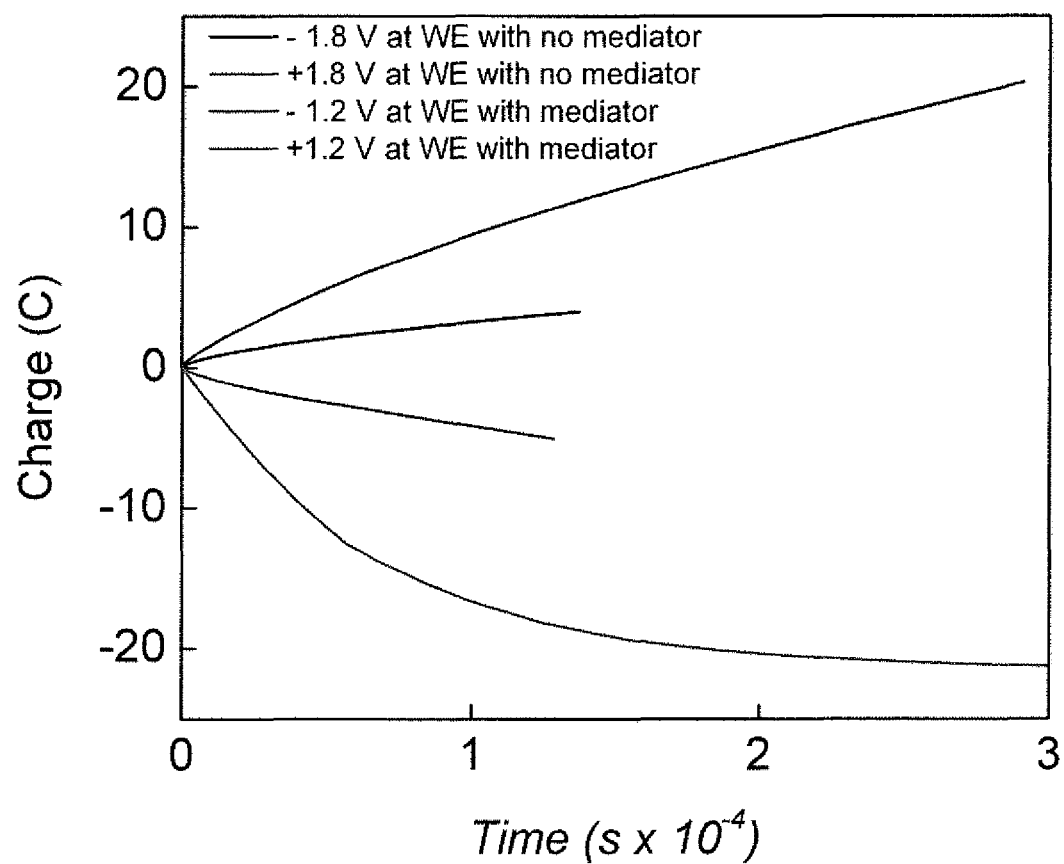
FIG. 4 is a graph showing the relationship between charge passed vs. time for a system operating at 1.8 V bias where 1 M $H_3PO_4$ is present, and 1.2 V bias in a system further comprising 0.5 M $H_3Mo_{12}PO_{40}$ as a mediator (present in the working electrode compartment). Positive charges indicate reduction at the working electrode, and negative charges correspond to oxidation reactions at the working electrode. The working electrodes were Pt foil having a total area of 30 cm$^2$. The graph lines, from top to bottom, correspond to the setup at: −1.8 V with no mediator; +1.8 V with no mediator; −1.2 V with mediator; and +1.2 V with mediator.

However, when the working electrode compartment was filled with 0.5 M $H_3Mo_2PO_{40}$ and the working electrode poised at only −1.2 V, a steady state current density of 0.18 mAcm$^{-2}$ was achieved (FIG. 4). The working electrode compartment quickly turned dark blue (Indicating PEB reduction) and bubbles were visible on the counter/reference electrode. GC headspace analysis concluded that the only gas evolved was oxygen (within the limits of detection) and the stoichiometry of electrons passed to moles of oxygen detected was 4:1, giving a Faradaic efficiency for oxygen evolution of 100%. The pH of the solutions in the working (0.5 M PEB) and reference/counter electrode compartments (1 M $H_3PO_4$) was found to be invariant over the course of the reaction. This was initially surprising, as oxidation of water to oxygen should release protons into solution (see eqs. 1 and 2). Moreover, when the experiment was repeated using $H_3Mo_{12}PO_{40}$ in the working electrode compartment and $HNO_3$ in the counter/reference electrode compartment, the pH in both compartments also did not change despite complete reduction of the PEB. This suggests that as the PEB is reduced during water oxidation, it also becomes a good proton acceptor, effectively acting to buffer the pH by storing both the protons and electrons generated during water oxidation.

This di-protonated, 2-electron reduced form of the PEB, $H_5Mo_{12}PO_{40}$, is remarkably stable to re-oxidation in air, either in aqueous solution at pH 0.3, or in the solid state after the water from the electrolyzed solution has been allowed to evaporate. Indeed, after standing in a beaker open to air under ambient laboratory conditions for 25 days, a solution of $H_5Mo_{12}PO_{40}$ in water appeared indistinguishable from a freshly prepared solution of the two-electron reduced PEB by both UV-Vis and $^{31}$P NMR spectroscopies. Moreover, the dark colour of $H_5Mo_{12}PO_{40}$ served as an excellent visual marker for any leakage of the PEB through the Nafion membrane, which would effectively "short-circuit" the cell, causing unproductive PEB oxidation/reduction events without any accompanying OER or HER. No such leakage was detected, even after storing the reduced PEB in the working electrode compartment for 5 weeks.

Figure 5:
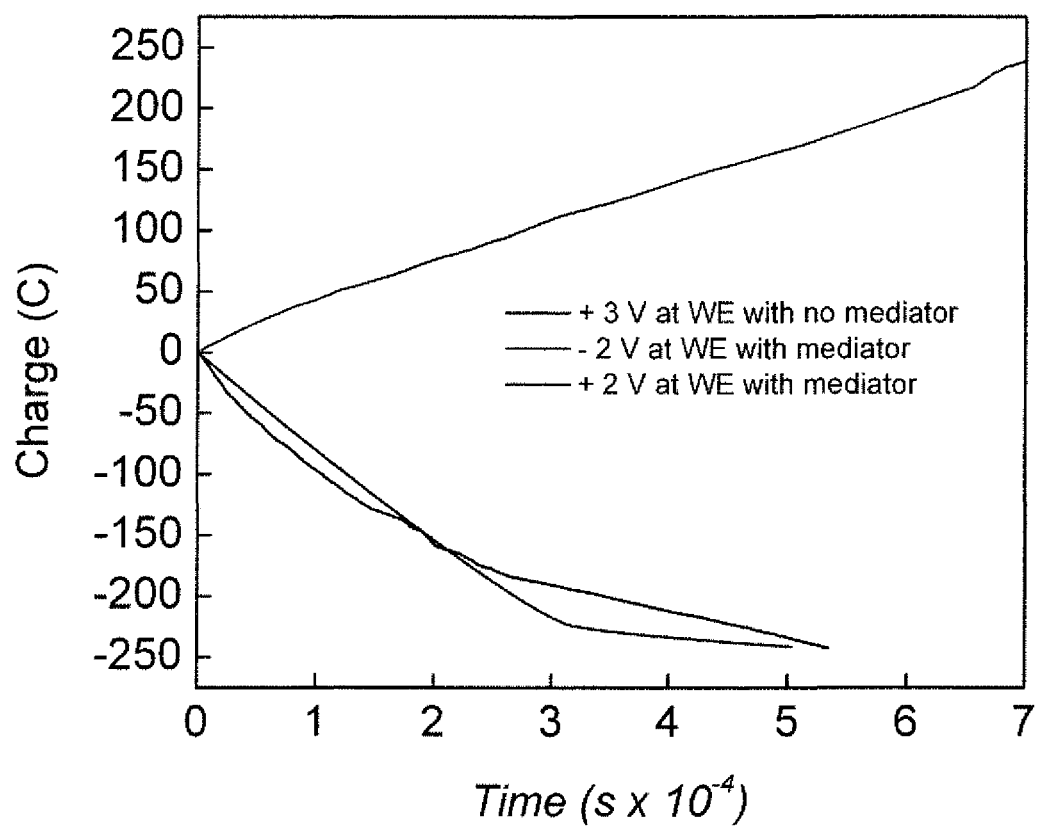
FIG. 5 is a graph showing the relationship between charge passed vs. time for a system operating at 3 V bias where 1 M $H_3PO_4$ is present, and 2 V bias in a system further comprising 0.5 M $H_3Mo_{12}PO_{40}$ as a mediator (present in the working electrode compartment). Positive charges indicate reduction at the working electrode, and negative charges correspond to oxidation reactions at the working electrode. The working electrodes were Pt foil having a total area of 30 cm$^2$. The graph lines, from top to bottom at 4×10$^{-4}$ s, correspond to the setup at: −2 V with no mediator; +3 V with mediator; and +2 V with mediator.
Figure 6:
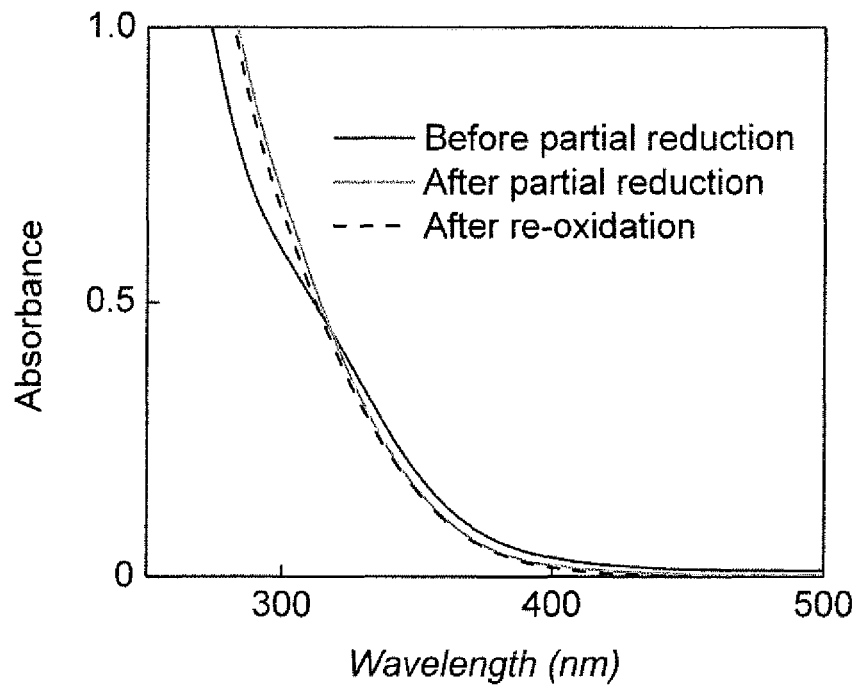
FIG. 6 is an overlap of partial UV-vis spectra for a mediator before use, after partial reduction and after complete re-oxidation. Samples were taken from 0.5 M $H_3Mo_{12}PO_{40}$/0.5 M $H_5Mo_{12}PO_{40}$ electrolyte solutions which were diluted to a concentration of 50 µM. From left to right (at 300 nm) is the spectrum before use, then after re-oxidation (dashed line), then after partial reduction.

To obtain the "stored hydrogen" from $H_5Mo_{12}PO_{40}$, a bias of +1.2 V (vs. floating reference) was applied across the cell, causing the PEB to become oxidized at the working electrode and simultaneously release protons. As Nafion is proton-permeable, these liberated protons were able to diffuse to the counter/reference electrode and combine with the electrons removed from the PEB to generate $H_2$. FIGS. 4 and 5 show the charge obtained from various solutions of $H_5Mo_{12}PO_{40}$ when the working electrode is poised at a positive relative potential. In all cases, complete re-oxidation to yellow $H_3Mo_{12}PO_{40}$ was accompanied by the cessation of $H_2$ production at the counter/reference electrode. Such re-oxidized PEB solutions had UV-Vis (see FIG. 6) and $^{31}$P NMR spectra identical to fresh $H_3Mo_{12}PO_{40}$, indicating that no decomposition of the PEB occurs during storage as $H_5Mo_{12}PO_{40}$.

Figure 7:
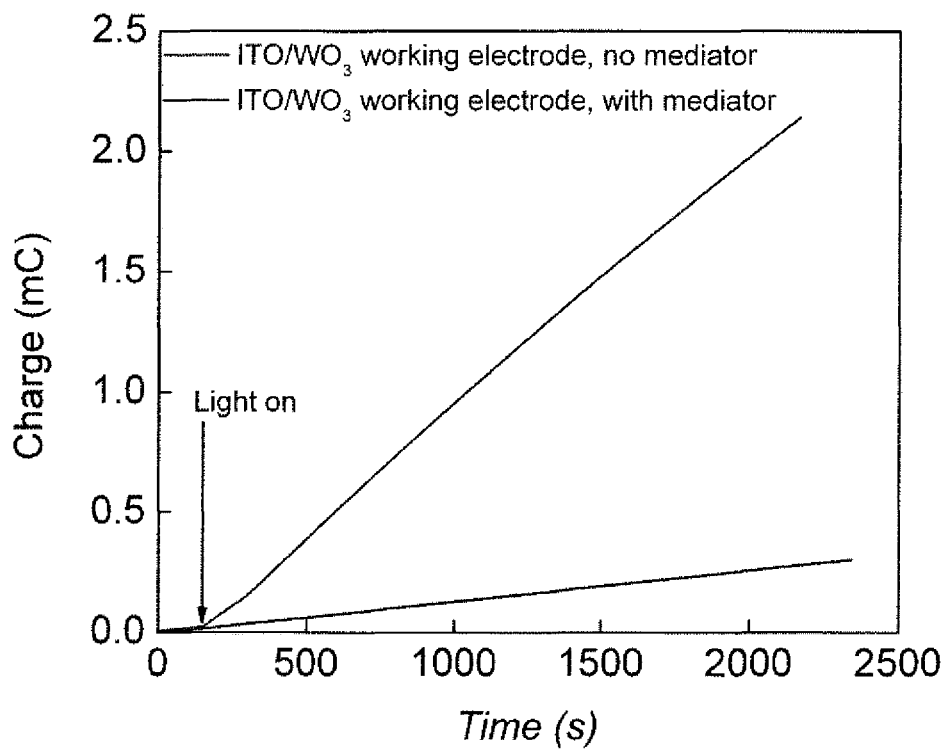
FIG. 7 is a graph showing the change in charge with irradiation time for a system having either an ITO or ITO/WO$_3$ working electrode. The composite ITO/WO$_3$ counter electrode has an area or 7.5 cm$^2$ and is connected electrically to a Pt wire working electrode in a floating reference configuration. The counter electrode was place in 1 M $H_3PO_4$. The working electrode was placed in either 1 M $H_3PO_4$ (black trace) or 0.5 M $H_3Mo_{12}PO_{40}$ (red trace), and irradiation commenced after the dark current flowing under these conditions was ascertained. The point at which irradiation, at λ>400 nm, begins is indicated by an arrow on the graph.

Noting that the OER is frequently the RDS in overall water-splitting, and that $H_2$ is the principle storage and safety concern, we investigated the use of PEBs for safe, low-voltage hydrogen production from water. Using $H_3Mo_{12}PO_{40}$ as the PEB and $WO_3$ as a photoanode for OER, the current density and hence rate of $O_2$ evolution was increased by a factor of approx. 7 compared to the situation where no PEB was used (FIG. 7, irradiation at wavelengths greater than 400 nm), although (see FIG. 7) OER with a $WO_3$ photoanode is slow even when the PEB is used. In practical terms, this might mean allowing a high-surface area $WO_3$ photoanode to sit in sunlight for the majority of the daylight hours, slowly generating $O_2$ (which can be allowed to escape to the atmosphere) and $H_5Mo_{12}PO_{40}$ (separated by a Nafion membrane in the cathode compartment. During this time, no hydrogen is made, and so there is no explosion risk and no need for any compression or other $H_2$-storage apparatus to be operational.

Future work from the present inventors intends to focus on the collection and accurate quantification of hydrogen and oxygen evolution in each method step. The quantification will be related to the amount of charge passed through the system i.e. an accurate determination of the Faradaic efficiency. Another aspect of future research will be to confirm the inventor's predictions for the rates of reaction for the decoupled oxygen and hydrogen evolution steps.

In a standard electrochemical water-splitting cell, with an applied bias of −1.5 V the oxygen evolving reaction might be expected to generate a current density of 0.025 mAcm$^{-2}$.

Was such a system to use a mediator as described herein, such as $H_3Mo_{12}PO_{40}$, the current density is expected to rise to 0.24 $mAcm^{-2}$.

Similarly, in a standard electrochemical water-splitting cell, with an applied bias of +1.5 V the hydrogen evolving reaction might be expected to generate a current density of 0.025 $mAcm^{-2}$ (the reaction is coupled to that of the oxygen generating reaction). Was such a system to use a mediator as described herein, such as $H_5Mo_{12}PO_4$, the current density is expected to rise to 0.79 $mAcm^{-2}$.

Thus, using the mediator of the invention in an oxygen generating reaction is expected to increase the oxygen evolution rate by around 10 times. Using the mediator of the invention in a hydrogen generating reaction is expected to increase the oxygen evolution rate by around 30 times. The application of a small bias to a hydrogen evolving cell, such as described herein, would release all the hydrogen for storage in a considerably quicker time frame than would be expected for a standard water-splitting cell. Accordingly the HER catalyst and $H_2$ compression equipment would only have to run for very short periods, greatly increasing the lifespan of these components.

Figure 8:
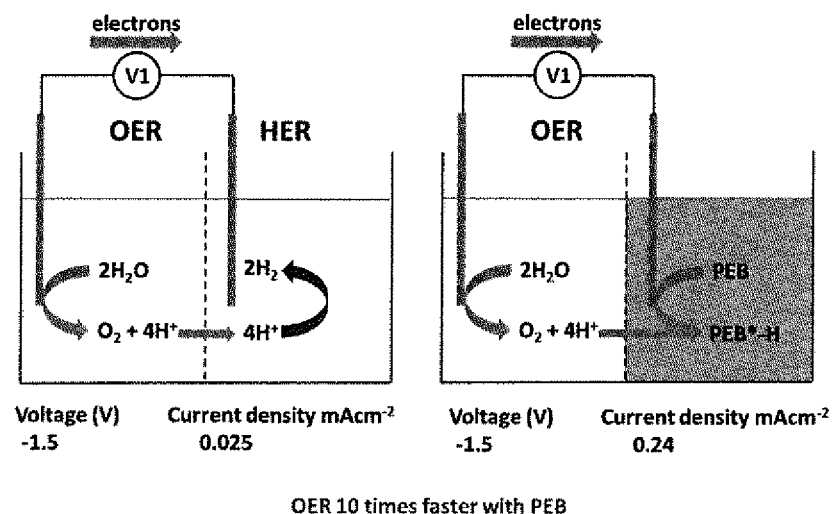
FIG. 8 is a cartoon showing the use of a mediator in an oxygen evolving reaction (right top) and a hydrogen evolving reaction (right bottom) as compared to a standard electrochemical cell developing both hydrogen and oxygen simultaneously (left top and bottom).
Figure 8:
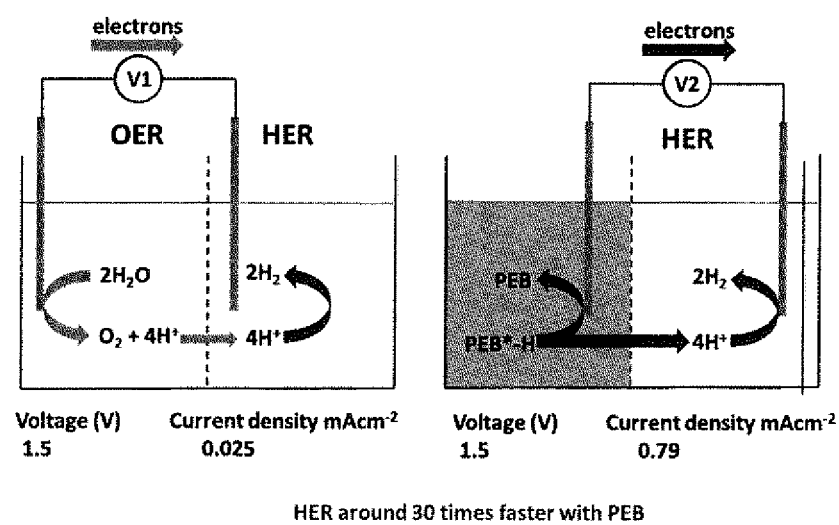

The reactions described are shown as cartoons in FIG. 8.

Further Examples

The following additional examples are provided solely to illustrate the present invention and are not intended to limit the scope of the invention, as described herein.
General Experimental Remarks All chemical reagents and solvents were purchased from Sigma Aldrich, except for phosphomolybdic acid ($H_3Mo_{12}PO_{40}$), 0.180 mm-thick Nafion N-117 membrane, Pt mesh and carbon felt, which were purchased from Alfa Aesar. AN chemical reagents and solvents were used as purchased. Hydrogen gas was supplied by BOC Gases. All electrolyte solutions were prepared with reagent grade water (18 MΩ-cm resistivity). pH determinations were made with a Hanna HI 9124 waterproof pH meter. UV-Vis spectra were collected on a JASCO V-670 spectrophotometer using 1.0 cm optical path quartz cuvettes.
Electrochemistry Three-electrode electrochemical studies were performed using either a CH Instruments CHI760D potentiostat or a Princeton Applied Research VersaSTAT 4 potentiostat. Unless stated otherwise, three-electrode electrochemistry was performed using a 2 mm diameter Pt disc working electrode (Princeton Applied Research) with a large area Pt mesh counter electrode and an Ag/AgCl reference electrode (BASi) at room temperature and pressure, under ambient atmospheric conditions. Solutions for cyclic voltammetry were quiescent, whilst both compartments of the H-cells were stirred during bulk electrolyses. Potentials were converted to NHE potentials by using E(NHE)=E(Ag/AgCl)+ 0.197 V. Two-electrode experiments were performed using either a CH Instruments CHI760D potentiostat or a Princeton Applied Research VersaSTAT 4 potentiostat by attaching the counter and reference leads to the same electrode, thus giving a floating reference configuration. The compartments of the H-cells were separated by either a piece of 0.180 mm-thick Nafion membrane, or a strip of 32 mm-wide benzoylated dialysis membrane (Aldrich), with these membranes being held in place by judicious application of Araldite epoxy glue (Bostik Findley, Ltd., UK). Current-potential curves showing the operation of a cell with all-carbon electrodes and using a cellulose membrane are shown in FIG. 14.

Figure 14:
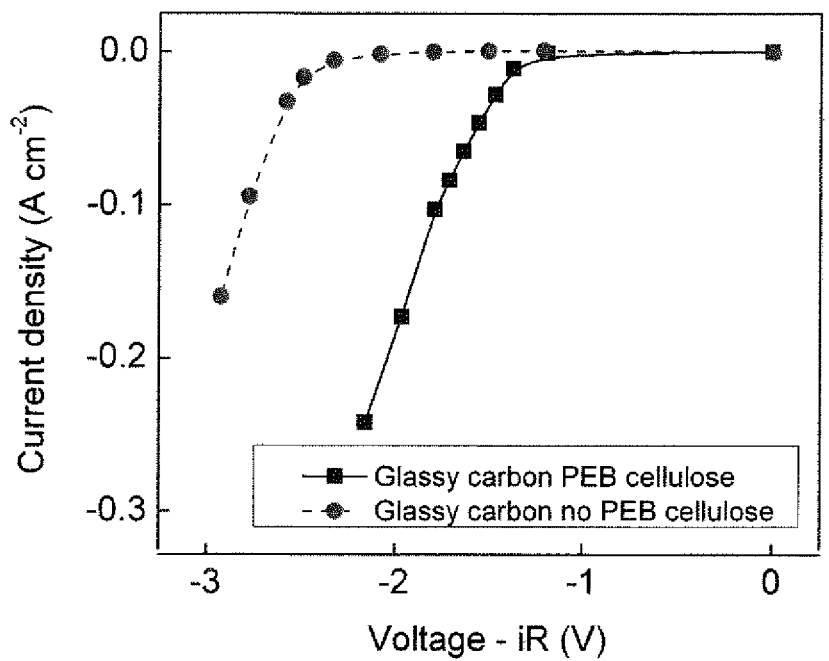
FIG. 14 shows the change in current density with potential for electrochemical hydrogen generation reaction experiments with and without the use of a mediator. The circles represent the experiment without the mediator.

FIG. 14 shows the current-density vs. potential curves for the HER in a benzoylated cellulose-membrane H-cell on carbon electrodes with and without the use of a proton-electron buffer in a two-electrode configuration. The potential values that are reported were corrected for solution ohmic losses. In all cases, the electrode performing the HER (in 1 M $H_3PO_4$) was designated as the working electrode. This was a glassy carbon button electrode of area 0.071 $cm^2$. The counter electrode was a large area strip of carbon felt. The counter electrode was either placed in 0.5 M PEB/PEB* ("with PEB") or 1 M $H_3PO_4$ ("without PEB"). Code: glassy carbon with PEB, black line and squares; glassy carbon without PEB, dashed red line and circles. Again, the dashed nature of this latter line highlights the fact that the anodic process associated with hydrogen production in the absence of a PEB is the oxidative degradation of the carbon anode.

Figure 9:
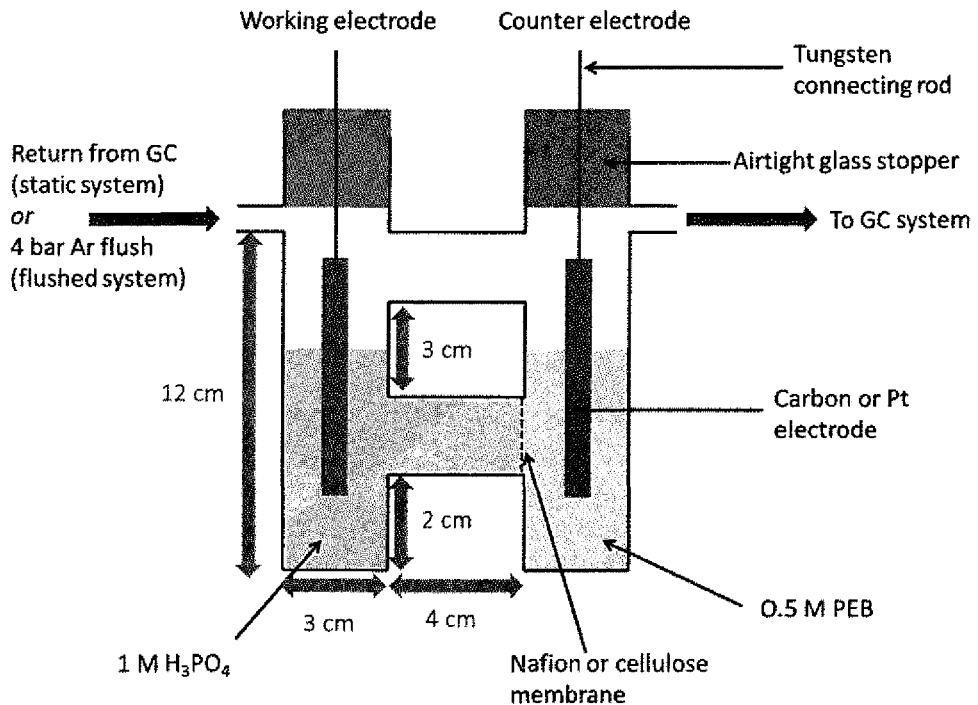
FIG. 9 is a schematic of an airtight H-cell used for gas chromatography, as described herein.

The basic dimensions of a typical bespoke H-cell are given in FIG. 9. The applied voltages were corrected for the ohmic resistance of the cells (the iR drop), to give an effective voltage ($V_{effective}$) for the potential-current curves according to the formula:

$$V_{effective} = V_{applied} - iR$$

where i is the current flowing through the cell and R is the resistance of the cell. Cell resistances were measured by both AC impedance spectroscopy and the iR test function available on the potentiostats. Potential-current curves are shown in FIG. 12.

Figure 12:
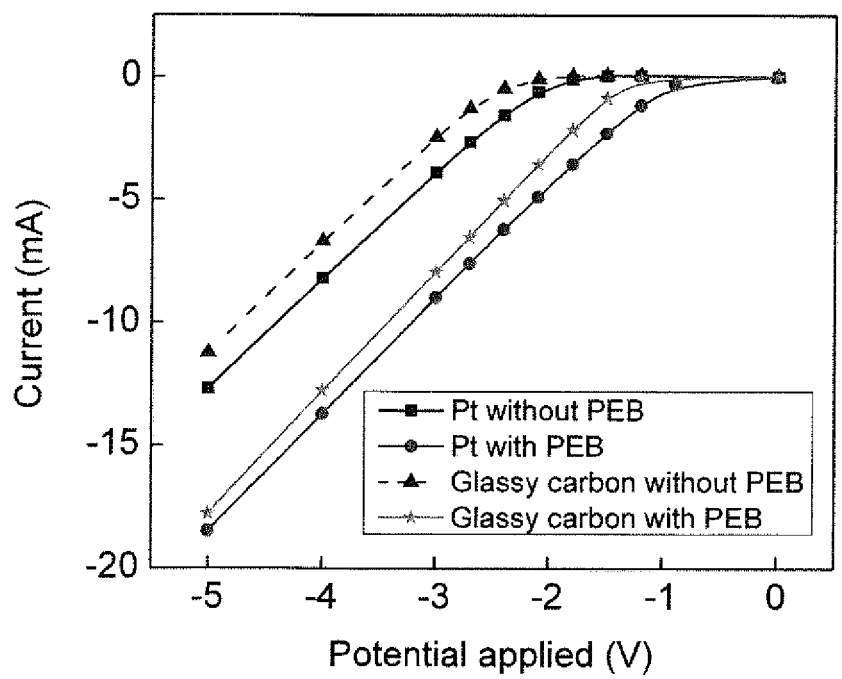
FIG. 12 shows the change in current with potential for electrochemical hydrogen generation reaction experiments with and without the use of a mediator (PEB—phosphomolybdic acid), and with Pt or glassy carbon working electrode. A Nafion-membrane H-cell was used.

FIG. 12 shows current-potential curves (not compensated for solution resistance) for the HER under various conditions in a Nafion-membrane H-cell. In all cases, the electrode performing the HER (in 1 M $H_3PO_4$) was designated as the working electrode. For Pt this was a disc electrode of area 0.031 $cm^2$ and for glassy carbon this was a button electrode of area 0.071 $cm^2$. The counter electrode for the Pt experiments was a large area Pt mesh, and for the carbon experiments it was a large area strip of carbon felt. The counter electrode was either placed in 0.5 M PEB/PEB* ("with PEB") or 1 M $H_3PO_4$ ("without PEB"). The dashed nature of this line highlights the fact that the anodic process associated with this HER is the oxidative degradation of the carbon anode. Hence this process cannot be considered as sustainable. However, when a reduced PEB was used with carbon electrodes, the lower polarisation experienced at the anode meant that no oxidative degradation was observed because the anodic half reaction is the oxidation of PEB*.
PEB—phosphomolybdic acid.
Redox Potentials of the PEB The first reduced state of $(H_3O^+)[H_2Mo_2PO_{40}]^-$ in aqueous solution is the 2-electron reduced species $(H_3O^+)[H_4Mo_{12}PO_{40}]^-$, the redox wave corresponding to which is at ca. 0.9 V in FIG. 2 (Maeda et al.; Tanaka et al.). FIG. 2 (inset) shows how the peak current for the anodic part of this wave varies with the square root of the scan rate: the linear trend observed indicates that this process involves solution-phase species under diffusion control. Based on the position of the OER catalytic wave (onset around +1.75 V in 1 M $H_3PO_4$, dashed line in FIG. 2) and the most positive potential necessary to still produce a two-electron reduction of $(H_3O^+)[H_2Mo_{12}PO_{40}]^-$ (+0.61 V, black line), a potential difference of 1.14 V across a 2-electrode cell such as the one shown in FIG. 1 should be sufficient to drive simultaneous water oxidation and 2-electron PEB reduction. For the reverse process (cathodic $H^+$ reduction concomitant with 2-electron re-oxidation of the PEB at the anode), a potential difference of 0.71 V (0.67--−0.04 V) is required. Hence the use of a PEB with an appropriately positioned redox couple should also allow water splitting at two voltages below that required to split water into hydrogen and oxygen in one step (minimum 1.23 V plus overpotential at room temperature and pressure) (Hamann et al.). FIG. 2A suggests that to drive such simultaneous OER and HER on Pt electrodes without using the PEB, at least 1.79 V (1.75--0.04 V) must be supplied. Hence we note that there is a slight energy penalty to be paid for decoupling the OER from the HER and running the water splitting reaction in two steps rather than one, with this energy penalty corresponding to the additional voltage required to reduce and re-oxidize the PEB (in this case it is 1.85–1.79=0.06 V).

pH Buffering During Water Splitting with Phosphomolybdic Acid

A two-compartment cell similar to the one shown in FIG. 1 was charged on one side with a 0.5 M aqueous solution of yellow fully-oxidised phosphomolybdic acid and on the other side with a 1 M solution of $H_3PO_4$. The two compartments of the H-cell were separated by a thin Nafion membrane, so that cations (in this case protons) could travel freely between the compartments, but the movement of anions (especially the PEB anions, which are of the general formula $[H_xMo_{12}PO_{40}]^-$) across the membrane was greatly attenuated.

Using a three electrode set-up consisting of a large area Pt mesh working electrode (in the PEB solution), a large area Pt mesh counter electrode (in the 1 M $H_3PO_4$ compartment) and an Ag/AgCl reference electrode, we performed controlled electrolysis at a potential slightly cathodic of the first redox wave shown in FIG. 2A (+0.50 V vs. NHE), in order to reduce the PEB in the working electrode compartment and oxidise water at the counter electrode.

By counting the charge passed, it is possible to obtain a solution that was ostensibly a 50:50 mix of the oxidised and 2-electron reduced species $(H_3O^+)[H_2Mo_{12}PO_{40}]^-$ and $(H_3O^+)[H_4Mo_{12}PO_{40}]^-$ ideal for studying both oxidation and reduction reactions with the PEB. The pH of the solutions in the working (0.5 M PEB) and counter electrode compartments (1 M $H_3PO_4$) was found to be invariant over the course of this electrolysis. Moreover, when the experiment was repeated using $(H_3O^+)H_2[Mo_{12}PO_{40}]^-$ in the working electrode compartment and $HNO_3$ in the counter electrode compartment, the pH in both compartments also did not change (see below), which suggests that as the PEB was reduced at one electrode and water oxidised to $O_2$ and protons at the other, the PEB acted to buffer the pH by storing both the protons and the electrons generated during water oxidation. This in turn suggests that the reduced and protonated PEB exists in solution as the mono-anion, $(H_3O_+)[H_4Mo_{12}PO_{40}]^-$, as the pH remained 0.3.

One question which then arises, is whether all polyoxometalates that have appropriately positioned redox waves can act as PEBs, and effectively buffer the pH during electrolytic water splitting. To test this, the polyoxometalate $Na_4(NH_4)_2[H_2VW_{17}O_{54}(VO_4)_2]$ (Miras et al.), which has a well-defined and reversible 1-electron redox wave in between OER and HER, and which is comparatively stable in both its oxidised and 1-electron reduced forms, was used in place of phosphomolybdic acid in a pH-buffering experiment, and it was found that there was no buffering of the pH during oxidation of $Na_4(NH_4)_2[H_2VW_{17}O_{54}(VO_4)_2]$ and simultaneous hydrogen production at the counter electrode (see below for details). Hence, it would seem that not all stable and reversible electron acceptors can also buffer the pH of a solution during electrolytic water splitting.

3 mL of a 0.5 M solution of phosphomolybdic acid (the mediator) in water (pH=0.30) was placed in one side of a small H-cell, and 6 mL of a 0.5 M solution of $HNO_3$ (pH=0.38) was placed in the other compartment. The compartments were separated by a Nafion membrane. Into the phosphomolybdic acid solution was placed a Pt mesh working electrode and an Ag/AgCl reference electrode. The counter electrode (also Pt mesh) was placed in the 0.5 M solution of $HNO_3$. Bulk electrolysis at +0.3 V vs. Ag/AgCl reduced the PEB and was continued until −180.0 C had been passed, equating to 62.2% of the theoretical maximum for this two-electron process (3 mL of a 0.5 M solution of $(H_3O^+)[H_2Mo_{12}PO_{40}]^-$ should require −289.5 C for full two-electron reduction). This would be expected to produce $180/96485=1.87\times10^{-3}$ moles of $H^+$, from the oxidation of water at the counter electrode. This in turn would be expected to reduce the pH in the two compartments significantly. Splitting the protons produced equally between the two compartments would be expected to give a final pH of 0.09 for the 3 mL mediator solution and 0.24 for the 6 mL $HNO_3$ compartment. Alternatively, if the concentrations of protons became equal between the two compartments, then a new global pH of 0.19 would be expected. However, after this reduction, the pH of the mediator solution was found to be 0.29, and the pH of the $HNO_3$ solution was 0.37, essentially the same as before any mediator reduction within the error of the pH meter (±0.01 pH units). Numerous iterations of this experiment were performed, with $HNO_3$ or $H_3PO_4$ in the counter electrode compartment, and in both two- and three-electrode configurations, and in all cases no observable pH change was detected during either water oxidation or subsequent re-oxidation of the reduced mediator.

No pH Buffering During Water Splitting with $Na_4(NH_4)_2[H_2VW_{17}O_{54}(VO_4)_2]$ The present inventors considered whether all polyoxometalates act as mediators and buffer the pH during water splitting. The polyoxometalate $Na_4(NH_4)_2[H_2VW_{17}O_{54}(VO_4)_2]$ which has a well-defined and reversible 1-electron redox wave in between OER and HER, was dissolved in water at a concentration of 0.01 M and 4 mL of this solution (pH=3.67) was placed in one side of a small H-cell. Meanwhile, 4 mL of a 0.03 M solution of $Na_2SO_4$ (pH=3.67) was placed in the other compartment. The compartments were separated by a porous frit. Into the $Na_4(NH_4)_2[H_2VW_{17}O_{54}(VO_4)_2]$ solution was placed a Pt mesh working electrode and an Ag/AgCl reference electrode. The counter electrode (also Pt mesh) was placed in the $Na_2SO_4$ solution. Bulk electrolysis at +0.8 V vs. Ag/AgCl oxidised the PEB and was continued until +3.8 C had been passed. Were buffering of the pH occurring during this oxidation of the mediator, the pH of the system would be expected to remain the same throughout and after the electrolysis. However, if no buffering of the pH was occurring, we would expect a rise in the global pH which would be expected to consume $3.8/96485=3.94\times10^{-5}$ moles of $H^+$, either via reduction of protons or reduction of $H_2O$ at the counter electrode. As 8 mL of a pH 3.67 solution contains only $1.71\times10^{-6}$ moles of $H^+$, we would expect that the majority of $H_2$ produced at the counter electrode would come from the reduction of water, leaving a final concentration of $OH^-$ in the 8 mL solution of 0.0047 M, equating to a pH of around 11.7. Alternatively, if the pH altered asymmetrically in the two compartments (i.e. the pH rise occurred only in the counter-electrode compartment), then the 4 mL counter electrode compartment would end up with a final concentration in $OH^-$ of 0.0097 M, equating to a pH of around 12.0. In the event, after electrolysis, a pH of 3.89 was measured in the working electrode compartment and a pH of 11.96 was found in the counter electrode compartment, consistent with no pH buffering when using this polyoxometalate as a potential mediator. Thus, phosphomolybdic acid is a better mediator than the polyoxometalate $Na_4(NH_4)_2[H_2VW_{17}O_{54}(VO_4)_2]$.

Cycling from PEB to PEB* and Back to PEB

The protonated and reduced form of the PEB (hereafter termed PEB*), could be subsequently re-oxidised to $(H_3O_+)[H_2Mo_{12}PO_{40}]^-$ in a three electrode configuration as described above by applying potentials anodic of the first redox wave in FIG. 2A (+1.1 V vs. NHE). As the re-oxidation of PEB* proceeded, bubbles of hydrogen were visible at the counter electrode (vide infra). Upon complete re-oxidation of PEB* the solution had returned to its original yellow colour, the pH was unchanged and $H_2$ production at the counter electrode ceased. The re-oxidised PEB solution had a UV-Vis spectrum identical to fresh $(H_3O^+)[H_2Mo_{12}PO_{40}]^-$, indicating that no substantial decomposition of the PEB had occurred during cycling to the reduced and protonated form (see Supplementary Information and Figure S2). Samples of PEB* were stored under air or under argon for various lengths of time before being re-oxidised, and the charges that could be extracted from these samples were compared to the charges originally passed in reducing $(H_3O_+)[H_2Mo_{12}PO_{40}]^-$ to PEB*. It was found that during cycling of PEB to PEB* and then immediately back to PEB under air (i.e. re-oxidation was started within 15 minutes of the end of reduction and was complete within 3 hours), 99.7% of the charge stored in PEB* during water oxidation could be recovered for $H_2$ production. Over longer periods of storage PEB* was slowly re-oxidised, such that after 3 weeks storage under air in a sealed container, 95% of the charge originally stored in PEB* could be recovered for $H_2$ production, and after 8 months in a sealed container under air, 72% of the charge could be recovered. In a separate test, a solution of PEB* was stirred in a container open to air for 2 weeks, after which time 98% of the charge originally stored in PEB* could be recovered. Hence, over the time course of a few days, PEB* is substantially stable with respect to spontaneous aerial oxidation, although the mechanism by which it slowly re-oxidises may be complex.

Phosphomolybdic acid could also be oxidised and reduced several times without any degradation being apparent, and without any obvious decline in its ability to decouple the OER from the HER. In support of this, a 500-cycle cyclic voltammogram of a 0.5 M solution of phosphomolybdic acid in water evinced no alterations in the shape or intensity of the spectrum. Likewise, analysis of samples of the PEB in various charge states by mass spectrometry showed that the PEB does not undergo decomposition or degradation when it is reduced and re-oxidised (Miras et al.).

Figure 10:
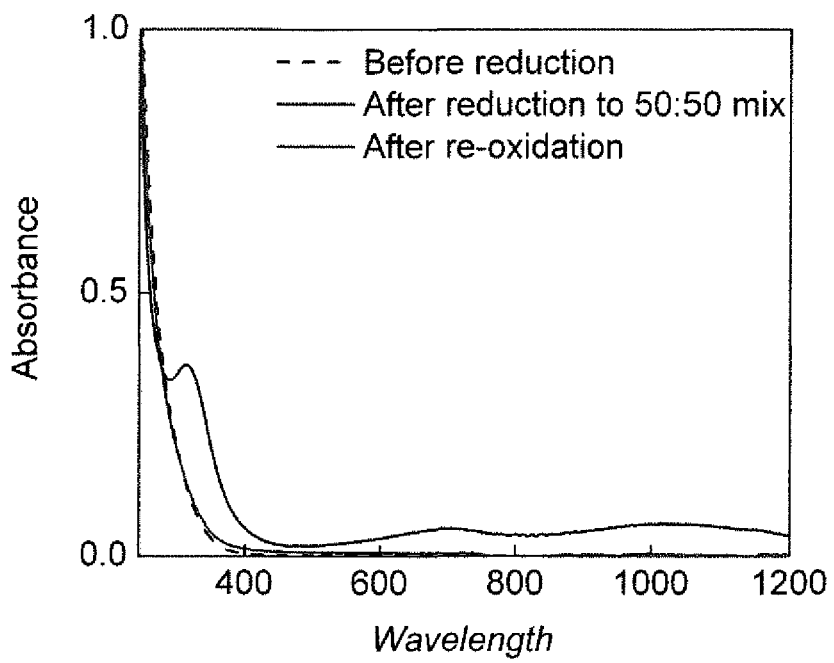
FIG. 10 shows the change in absorbance with wavelength for sample of 0.5 M phosphomolybdic acid (diluted to 1.0×10$^{-6}$ M with water) before (dashed line) and after (top line at 700 nm) reduction to a 50:50 mix of $(H_3O^+)[H_4Mo_{12}PO_{40}]^-$ and $(H_3O^+)[H_4Mo_{12}PO_{40}]^-$ in a three-electrode configuration with Pt mesh working and counter electrodes and an Ag/AgCl reference electrode. The sample was then re-oxidised electrochemically until no further charge was passed, and the PEB solution had returned to its original yellow colour (solid line, overlapping with dashed line). All these solutions were diluted to 1.0×10$^{-6}$ M with water immediately before spectrum acquisition.

An example complete cycle of the PEB is given below. This experiment was performed numerous times, in both three and two-electrode configurations, using different electrodes, membranes, PEB concentrations (0.01 to 0.5 M) and either $H_3PO_4$ or $HNO_3$ in the counter electrode compartment. Very similar results were obtained in all cases. A typical reaction was as follows: 20 mL of a 0.5 M solution of $(H_3O^+)[H_2Mo_{12}PO_{40}]^-$ in deionised water (pH 0.3) was taken in one compartment of an H-cell. This chamber was further equipped with a large area Pt mesh working electrode and an Ag/AgCl reference electrode. The other compartment of the H-cell was filled with 40 mL of 1 M $H_3PO_4$ (pH=0.9) and equipped with a Pt mesh counter electrode. The compartments of the cell were separated by a Nafion membrane. Electrolysis was initiated at +0.3 V vs. Ag/AgCl, at room temperature and open to air without degassing, and the phosphomolybdic acid was observed to turn blue. Bubbles were visible at the counter electrode. Electrolysis was stopped after −147.8 C had been passed. The reduced sample was then re-oxidised at +0.9 V vs. Ag/AgCl in a three-electrode configuration as before, and +147.4 C of charge was extracted, equating to 99.7% of the charge originally stored in the reduced PEB. The PEB had returned to its original yellow colour, and a UV-vis spectrum of this solution (diluted to $5.0×10^{-5}$ M with water as before) found to match exactly to the spectrum of a fresh solution of $(H_3O^+)[H_2Mo_{12}PO_{40}]^-$ in water at $5.0×10^{-5}$ M. This process can be repeated multiple times without any decomposition becoming apparent. FIG. 10 gives a comparison of the UV-vis spectra of a sample of 0.5 M $(H_3O^+)[H_2Mo_{12}PO_{40}]^-$ in water before and after reduction to a 50:50 mix of $(H_3O_+)[H_2Mo_{12}PO_{40}]^-$ and $(H_3O^+)[H_4Mo_{12}PO_{40}]^-$, along with a spectrum of the subsequently re-oxidised $(H_3O^+)[H_2Mo_2PO_{40}]^-$ solution. All these solutions were diluted to $5.0×10^{-5}$ M with water immediately before spectrum acquisition.

Figure 15:
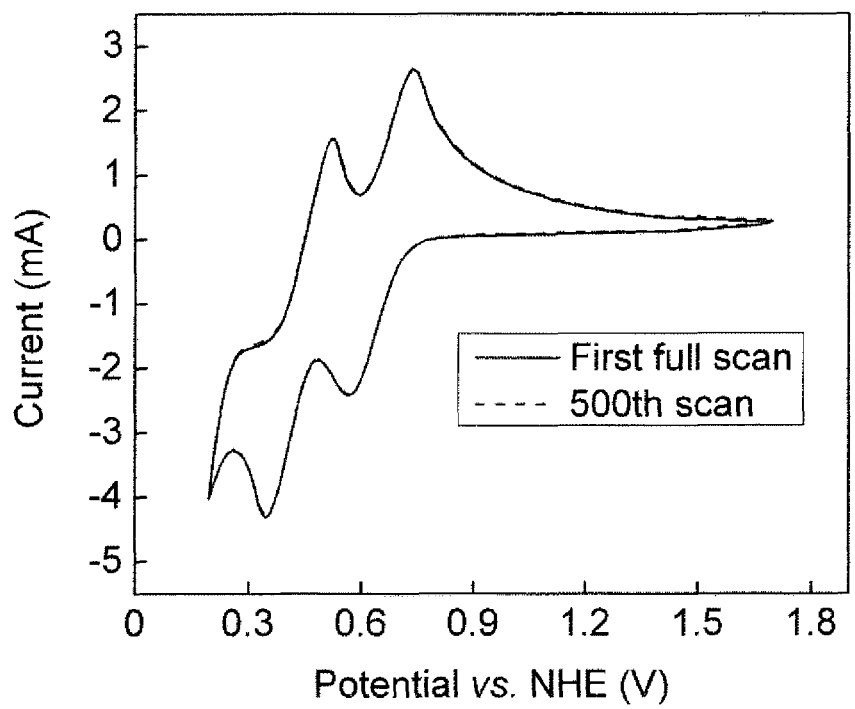
FIG. 15 shows the change in current with potential for a mediator after one full CV cycle (solid line) and after 500 such cycles (the dashed line sitting on top of the solid line).

FIG. 15 shows the comparison of the CV of 0.5 M phosphomolybdic acid (solid line) after one full cycle from +1.7 V to +0.1 V (vs. NHE) and after 500 such cycles (dashed line). A three-electrode, single compartment setup was used, with a 2 mm diameter Pt disc working electrode, Pt mesh counter electrode and an Ag/AgCl reference electrode at a scan rate of 100 mVs$^{-1}$, without any iR compensation.

Figure 16:
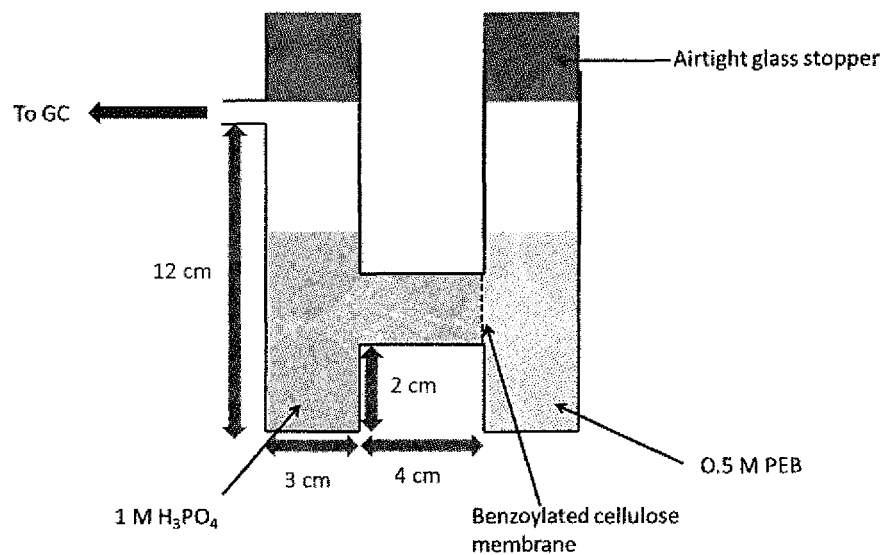
FIG. 16 is a schematic of the H-cell used to determine the permeability of a benzoylated cellulose membrane to $H_2$.

FIG. 16 is a schematic of the H-cell used to determine the permeability of a benzoylated cellulose membrane to $H_2$.

Efficiency of the PEB System

The efficiency of an electrochemical system such as is described herein can be expressed as the ratio of the thermodynamic potential to the operating potential that was actually used. Equation 5 gives the chief factors that lead to efficiency losses ($E_{loss}$) as:

$$E_{loss} = \eta_{anode} + \eta_{cathode} + iR_{solvent} + E_{membrane} + E_{pH} \quad \text{(Eq. 5)}$$

where $\eta_{anode}$ and $\eta_{cathode}$ are the overpotentials at the anode and cathode, $iR_{solvent}$ is the potential loss associated with solution resistance, $E_{membrane}$ is the potential loss due to the membrane and $E_{pH}$ is the potential loss stemming from the formation of pH gradients across the membrane (Hernández-Pagán et al.). The anodic and cathodic overpotentials can be reduced by employing catalysts on the electrodes. For example, the use of $RuO_2$ as an extremely effective anode for the OER could afford a current density of 0.1 A cm$^{-1}$ (at room temperature and at pH 1) at around +1.5 V vs. NHE (Lodi et al.; Burke et al.), which compares to around +2.05 V for the same current density on Pt. Meanwhile, the resistance from the solution and membrane can be minimised by decreasing the distance between the electrodes and optimising the membrane thickness. The $E_{pH}$ term is more problematic (although the effects can be mitigated under very acidic conditions), and equates to a loss of 59 mV per pH unit difference across the membrane, according to equation 6 (Sleutels et al.):

$$E_{pH} = (RT/F)\ln(10^{pH_{cathode} - pH_{anode}}). \quad \text{(Eq. 6)}$$

Hence in this case, $E_{pH}$ is in the region of 36 mV, which is negligible in comparison to size of the chief source of error, $iR_{solvent}$ (see Supplementary Information). In practice, as the Faradaic efficiency for both oxygen evolution and hydrogen evolution are 1, we compared the overall system efficiency for electrochemically-driven water splitting on Pt electrodes by comparing the current densities obtained at a given voltage. Using the data provided by the Figures herein, we obtain an overall efficiency of 79% for the PEB system (relative to a single-step process where OER and HER remain coupled) for the production of hydrogen and oxygen at 100 mAcm$^{-2}$ on Pt electrodes. However, in the absence of the loss factors discussed in equation 5, the theoretical system efficiency for a PEB electrolysis cell at this current density is 97% relative to the single step process, which is simply the additional voltage (~60 mV) required to drive the PEB/PEB* couple (see Supplementary Information for a derivation of these efficiencies). As previously stated, we attribute the difference to residual uncorrected solution resistance, which affects the two-step system twice as much as the one-step system, and which will have a greater effect as the current density increases (as $iR_{solvent}$ has an explicit dependence on the current).

Gas Chromatography

Gas chromatography headspace analysis (GCHA) was conducted in air-tight H-cells (FIG. 9) in a two-electrode configuration, using an Agilent Technologies 7890A GC system with a pneumatically operated automatic gas sampling valve to monitor the gases evolved. The cells were connected to the GC system using bespoke airtight glass-to-metal adapters and copper tubing of ⅛ inch internal diameter. The column was a 30 metre-long 0.320 mm widebore HP-molecular sieve column (Agilent). The GC oven temperature was set to 40° C. and the carrier gas was Ar. The GC system was calibrated for $O_2$ and $H_2$ using certified standards of these gases at a range of volume % in argon supplied by CK Gas Products Limited (UK). The GC was calibrated for both static and flushed gas samples (vide infra).

The dimensions provided in FIG. 9 are solely to give an idea of the size of the cells, and varied between individual H-cells. Gas inlet/outlet ports and electrode ports were quick-fit glassware joints. These were greased and clamped before reaction initiation. Each compartment was stirred during operation.

Linear fits of volume % vs. peak area were obtained, which allowed peak areas to be converted into volume % of $O_2$ and $H_2$ in the H-cell headspace. The amount of dissolved gases in the solutions was also calculated using Henry's Law, and final values of $H_2$ and $O_2$ produced were adjusted accordingly, although the adjustment was negligible in most cases. Correction for the increase in cell pressure with gas evolution was also made. A small air leak into the cell introduced during sample-loop switching was corrected for by calibrating the amount of $O_2$ and $N_2$ in air and applying appropriate corrections for these based on the amount of $N_2$ observed in the chromatographs. Total H-cell/GC system headspaces were calculated by filling the cells with water at room temperature and adding on volumes for the GC sample loop (0.25 mL) and connecting tubing to, from and within the GC system. Typical headspaces were on the order of 95 mL. Two different experimental variations were used as shown in FIG. 9, and $O_2$ and $H_2$ headspace concentrations were determined using both methods. In both cases, PEB reduction at the counter electrode gave oxygen (but no hydrogen was detected in the headspace), whilst PEB oxidation at the counter electrode gave hydrogen (but only traces of oxygen from a small air leak into the cell during sampling) within the detection limits of the GC system, which were gauged to be ±0.04% $H_2$ in the headspace and ±0.08% $O_2$ in the headspace.

Firstly, a static cell configuration was found to be ideal for measuring the increasing concentration of gases in the reaction headspace. This involved routing the gas outlet port of the GC system back into the cell, such that only the volume of the GC sample loop (0.25 mL) was lost with each sampling event. This technique was very effective for measuring $H_2$, albeit with a certain delay time for the hydrogen to diffuse into the sampling loop, which explains the time lag between gas production (charge passed curve) and gas detection (see FIG. 13). Charges passed were converted into expected volume % in the headspace by converting charges to an expected number of moles of $H_2$ (by dividing by 2F, where F is the Faraday constant), and then taking the standard volume of 1 mole of an ideal gas at room temperature and pressure to be 22.4 L. Faradaic efficiencies were then calculated by taking the ratio of gas volume % based on the charge passed to the gas volume % measured by GC. All $H_2$ determinations were performed at least twice, and average Faradaic efficiencies were 100.5% (±2%) for Pt and 99.1% (±2%) for carbon electrodes respectively. The main source of error was the estimation of the cell headspace (±1 mL). A representative trace is given in FIG. 13.

Figure 13:
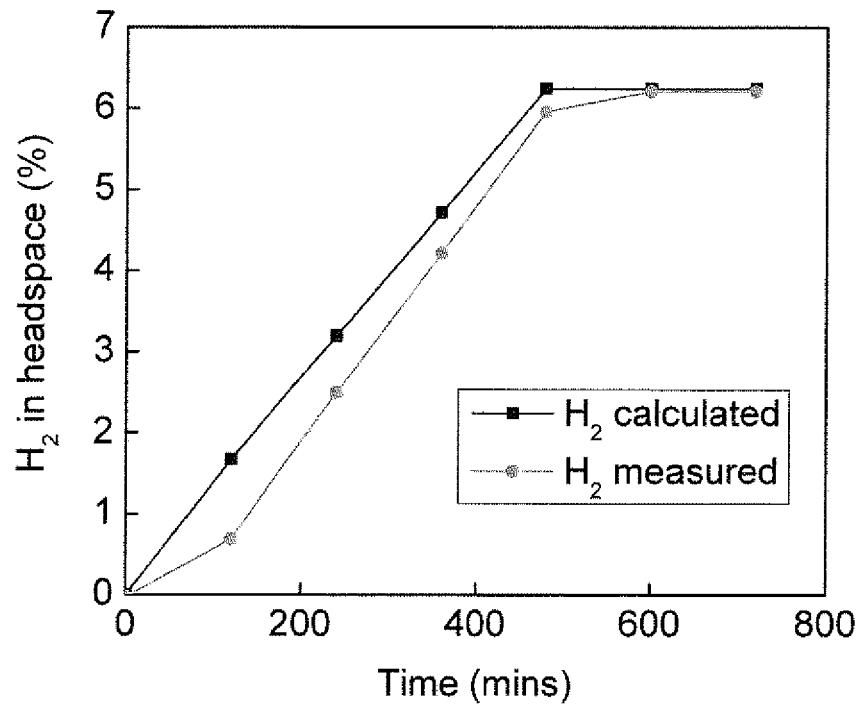
FIG. 13 shows the change in % hydrogen in the electrode headspace over time in a hydrogen evolving method according to one embodiment of the invention. The top line is the calculated (theoretical) amount, and the bottom line is the measured amount in the experiment.

FIG. 13 shows the representative trace of cumulative $H_2$ build-up in the cell headspace during hydrogen evolution on carbon electrodes. A two-electrode set-up was used at an effective potential difference of 1.4 V. The expected volume % of $H_2$ in the headspace was calculated from the charge passed during electrolysis ("$H_2$ calculated": top line). Electrolysis was terminated at 480 minutes. The volume % of $H_2$ in the headspace ("$H_2$ measured": bottom line) was determined by the GC system in a static cell configuration, with sampling every 2 hours. The time lag between when the hydrogen is made electrolytically and when it is measured by the GC is due to the slow effusion of $H_2$ through the narrow tubing in the GC system under these static conditions.

Oxygen could also be detected in static cells. However, due to Graham's Law of effusion, the increased mass of $O_2$ was found to give a long time lag between gas production and gas detection. Typically, this resulted in only 50% of the expected gas being detected within 8 hours of the end of electrolysis. Hence, for more rapid $O_2$ analysis, a flushed cell configuration was used. This involved passing a certain amount of charge, before terminating the electrolysis reaction and then flushing the contents of the cell headspace through the sample loop using a low-pressure Ar feed. This precluded incremental measurements of the gas concentrations in the headspace, as the headspace contents were flushed to the external environment within a few seconds. However, accurate single-point measurements of the gas concentrations in the headspace could be made if sampling occurred within this flushing time window. Charges passed were converted into expected volume % in the headspace by converting charges to an expected number of moles of $O_2$ (by dividing by 4F, where F is the Faraday constant), and then taking the standard volume of 1 mole of an ideal gas at room temperature and pressure to be 22.4 L. Faradaic efficiencies were then calculated by taking the ratio of gas volume % based on the charge passed to the gas volume % measured by GC.

$O_2$ determinations were performed at least three times, and average Faradaic efficiencies were 100.2% (±5%) for Pt and <5% for carbon electrodes respectively. The larger uncertainty found for $O_2$ quantification reflects both errors in the estimation of the cell headspace and the error in the correction applied for the air leak into the GC system during sampling. In addition, the GC system is inherently less sensitive to oxygen (when using Ar as the carrier gas) than it is to hydrogen.

This technique was also used to determine the Faradaic efficiency for PEB reduction at high ambient $O_2$ levels and with a benzoylated cellulose membrane. Accordingly, neither the headspace nor the solutions were degassed with Ar. PEB reduction was then commenced using two Pt mesh electrodes at a current density of between 5 and 9 mAcm$^{-2}$ of electrode (based on the area of mesh submerged and the manufacturer's estimate of the effective surface area of the mesh being approximately 9.1 cm$^2$ per geometric inch$^2$). Faradaic efficiencies were then calculated by taking the ratio of gas volume % based on the charge passed to the gas volume % measured by GC. In this case the O$_2$ determinations were performed twice, and average Faradaic efficiencies were 96.2% (±5%), suggesting that conducting the PEB reduction in the presence of atmospheric levels of O$_2$ does not significantly alter the Faradaic yield of this process, within the error of this technique.

Oxygen Evolutionary Reaction at Pt Electrodes with a Mediator

The working electrode chamber of a two compartment H-cell was charged with 1 M H$_3$PO$_4$ (pH=0.9), whilst the other chamber was filled with a 50:50 mix of 0.5 M (H$_3$O$^+$)[H$_2$Mo$_{12}$PO$_{40}$]$^-$ and its corresponding 2-electron reduced form (H$_3$O$_+$)[H$_4$Mo$_{12}$PO$_{40}$]$^-$ in water, at pH 0.3. The working electrode was a 0.031 cm$^2$ area platinum disc electrode and the combined counter/reference electrode (two-electrode configuration) was a large area Pt mesh. The two chambers of the H-cell were separated by a Nafion membrane, so that cations (here only protons) could travel freely between compartments, but the movement of anions (especially the PEB anions) was greatly attenuated.

Figure 11:
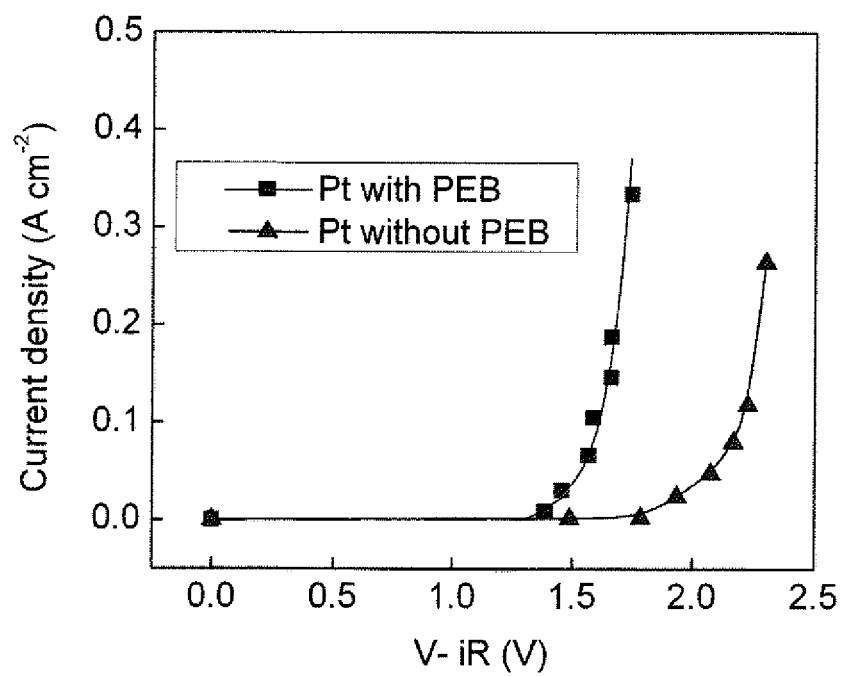
FIG. 11 shows the change in current density with potential for electrochemical oxygen generation reaction experiments with and without the use of a proton-electron buffer in a two-electrode configuration. The oxygen generation was at a Pt electrode. The potential values that are reported were corrected for solution ohmic losses. In both cases, the electrode performing the oxygen evolution reaction (in 1 M $H_3PO_4$) was designated as the working electrode. This was a disc electrode of area 0.031 cm$^2$. The counter electrode was a large area Pt mesh. The counter electrode was either placed in 0.5 M PEB/PEB* ("with PEB") or 1 M $H_3PO_4$ ("without PEB").

FIG. 11 shows how the current density through such a cell varies with the magnitude of the effective applied voltage (as set on the working electrode in the 1 M H$_3$PO$_4$). Also shown for comparison is the current density curve for the same cell set-up, but where both chambers were filled with 1 M H$_3$PO$_4$, i.e. using no PEB. It is apparent that much greater current densities are obtained at a given voltage when the PEB is used, whether the voltage applied is positive (oxidation of water at the nominal working electrode, FIG. 11) or negative (reduction of protons at the working electrode). In support of this, steadily bubbling from the working electrode was observed when the counter electrode compartment was filled with PEB and effective voltages above +1 V or below −1 V were applied to the working electrode. No bubbling was visible from either electrode until voltages of at least ±2 V were used in cells using only 1 M H$_3$PO$_4$, as expected from FIG. 11. Gas chromatography headspace analysis (GCHA) was used to confirm the nature and amount of the gases evolved under these conditions (see above).

Electrochemical System Efficiency

As the Faradaic efficiency for both oxygen evolution and hydrogen evolution are 1, it is possible to compare the overall system efficiency for electrochemically-driven water splitting on Pt electrodes by comparing the current densities obtained at a given voltage. Taking a current density of 100 mAcm$^{-2}$, the one step process to evolve hydrogen and oxygen simultaneously needs 2.21 V, which over 1 second equates to an energy consumption of 0.221 Jcm$^{-2}$ of electrode (FIG. 3A, main text). This produces 0.1 Ccm$^{-2}$-worth of both oxygen and hydrogen.

For the system using Pt at a current density of 100 mAcm$^{-2}$, 1.61 V is required to drive the oxygen evolution and reduce the PEB (FIG. 11), whilst 1.20 V is required to re-oxidize the mediator and produce H$_2$ at a current density of 100 mAcm$^{-2}$. This means that (over 1 second) 0.161 Jcm$^{-2}$ of electrode is required to make 0.1 Ccm$^{-2}$ of oxygen and 0.12 Jcm$^{-2}$ of electrode is required to make 0.1 Ccm$^{-2}$ of hydrogen. This gives a total energy with the mediator of 0.281 Jcm$^{-2}$ of electrode to produce 0.1 Ccm$^{-2}$ of electrode of both oxygen and hydrogen, an efficiency of 79% compared to the one-step system.

The theoretical efficiency loss (i.e. the loss encountered if all the losses listed in equation 5 in the main text are negligibly small) compared to the one step system is simply the energy penalty imposed by having to oxidize/reduce the mediator, i.e. 0.06 V. Hence at 100 mAcm$^2$ this should equate to 0.221 V+0.06 V=0.227 V in total to do the two step process. This equates to a theoretical maximum efficiency of 97% for the two-step system compared to the one step system. The fact that the current system falls short of this is due mainly to residual uncorrected resistance in the cell design, which effects the two-step system twice as much as the one-step system.

Exploration of Alternative Membranes for Water Splitting Using a PEB

Phosphomolybdic acid, is a comparatively large molecule (MW~1800, effective cross sectional area ~1 nm$^2$) (Himeno et al.). This, allied to the fact that a PEB allows H$_2$ and O$_2$ production to be separated in time, means that pure H$_2$ and O$_2$ streams can be obtained from aqueous solutions using membranes that simply retain the PEB in one compartment of the cell. Thus, we replaced the Nafion membrane in our H-cell with a commercially available benzoylated cellulose dialysis membrane, designed to separate molecules with MW>1200 (see below). This membrane proved very effective at preventing the mixing of a 50:50 solution of PEB: PEB* in one compartment and 1 M H$_3$PO$_4$ in the other over the time-course of several days. Current-potential (i-V) analysis of this cell in a two electrode configuration with carbon electrodes as before produced curves almost identical to those obtained for the same electrode set with a Nafion separation membrane, showing that cell performance was not impaired by replacing Nafion with cellulose. Hence temporally separated OER and HER means that new types of membrane (i.e. types that might not be as gas-impermeable as Nafion), can be considered for use in proton exchange membrane electrolysers (PEMEs) without dangerous mixes of H$_2$ and O$_2$ developing in the cell headspace. Similarly, separating the OER and HER in time could be important for PEMEs operating at high pressures (>200 bars), where the rate of H$_2$ loss via permeation across Nation membranes can be up to the equivalent of 0.4 Acm$^{-2}$, with implications for both the safety and long-term performance of such electrolysers (Barbir et al.).

Permeability of the Membrane to H$_2$ and O$_2$

To test how quickly H$_2$ permeates the membrane (a benzoylated cellulose membrane), the H-cell shown in FIG. 16 was used. In this cell design, the headspace for the two compartments was not linked, such that the only route for cross-over for gases within the cell was for the gases in the headspace on one side to dissolve in the liquid present in that chamber and then diffuse through the membrane into the liquid in the other chamber, and thence diffuse into the headspace of this other chamber. One side of this cell was filled with 30 mL of yellow oxidised PEB and was bubbled with pure H$_2$ gas for 100 minutes. After bubbling with H$_2$ for this time, the headspace of the PEB chamber of the cell was sealed off and the other chamber of the cell was filled with a non-degassed solution of 1 M H$_3$PO$_4$. The headspace of this 1 M H$_3$PO$_4$ chamber was purged very briefly (around 10 seconds) with Ar to remove excess oxygen, before the outlet of this chamber was connected to the GC.

The headspace was then sampled every 10 minutes without any re-circulating of gas or positive pressure of flow gas, in order to ensure that the pressure in the headspace of the 1 M $H_3PO_4$ chamber remained at or below the pressure of the $H_2$-containing chamber. Using this method, $H_2$ was detected in the 1 M $H_3PO_4$ chamber headspace after 30 minutes. When the headspace of the $H_3PO_4$ chamber was filled directly with $H_2$, hydrogen could be detected by the GC using this method within 20 minutes. Hence the membrane is considered to be essentially freely permeable to $H_2$, in line with its large pore size and the manufacturers specification. Likewise, by the same reasoning, it is to be expected that the membrane is also freely permeable to $O_2$.

Hydrogen is explosive in air at concentrations between 4% and 74% by volume. Hence it is recommended compressing and removing the majority of the air in the headspace of a working electrolyser before $H_2$ production is commenced: this should not be too hard, as the $H_2$ Itself will have to be compressed and removed for use anyway, and the vast majority of the $O_2$ produced can still be vented to the air. Alternatively, in a flowed liquid system, the earliest fractions of $H_2$ that are collected and which would be contaminated with $O_2$ could be diverted, such that the later fractions were not contaminated by $O_2$ during this "cross-over" phase. Alternatively, if a Nafion membrane is used, gas cross over is low anyway, and the PEB can be used to mitigate against high pressure $O_2$ and $H_2$ being produced simultaneously (the diffusion of $H_2$ and $O_2$ through Nafion at high temperature is one of the chief causes of degradation of these membranes).

Behaviour of the Mediator Towards $H_2$:

A 0.5 M solution of yellow, fully oxidised phosphomolybdic acid was bubbled with $H_2$ gas for 100 minutes and then stirred under an atmosphere of $H_2$ for a further 14 h. No colour change (indicative of a reduction to the dark blue form of the phosphomolybdic acid) was detected either by eye or by UV-vis spectroscopy (see FIGS. 17A and 17B). Hence it can be deduced that the oxidised mediator does not react with pure $H_2$ gas, at least over the time course of this experiment, i.e. the current density for this process would be negligible.

Figure 17:
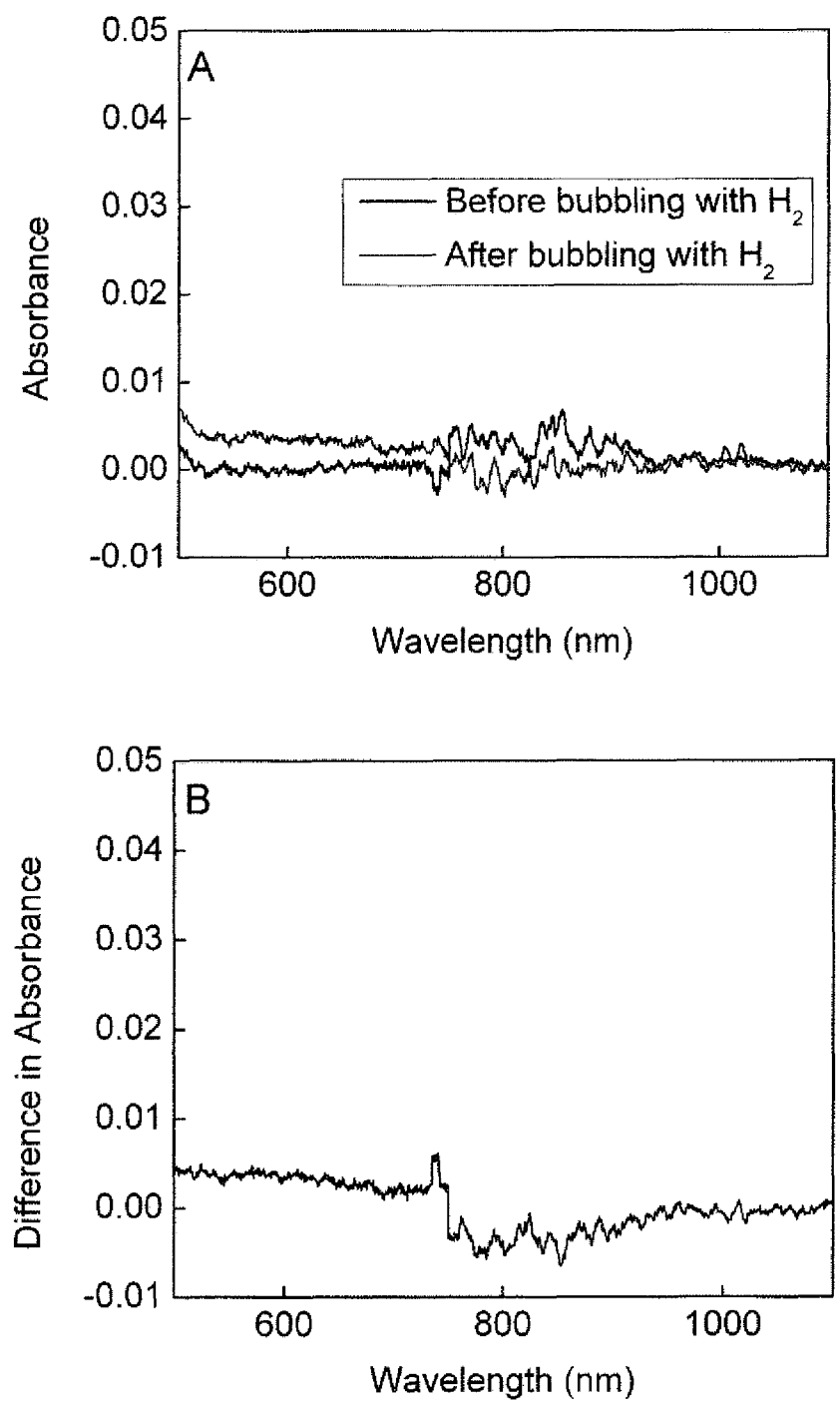
FIG. 17A is a comparison of a sample of fully oxidised 0.5 M phosphomolybdic acid before (bottom line at 600 nm) and after (top line at 600 nm) bubbling with $H_2$ for 100 minutes and then being stirred under a hydrogen atmosphere for a further 14 h.
FIG. 17B is the difference spectrum (after bubbling–before bubbling) of the spectra shown in FIG. 17A.

FIG. 17A is a comparison of a sample of fully oxidised 0.5 M phosphomolybdic acid before (bottom line at 600 nm) and after (top line at 600 nm) bubbling with $H_2$ for 100 minutes and then being stirred under a hydrogen atmosphere for a further 14 h. FIG. 17B is the difference spectrum (after bubbling–before bubbling) of the spectra shown in FIG. 17A. All these solutions were diluted to $1.0 \times 10^{-3}$ M with water immediately before spectrum acquisition. The discontinuity in the data around 750 nm is due to the change-over of the detector at this wavelength.

Figure 18:
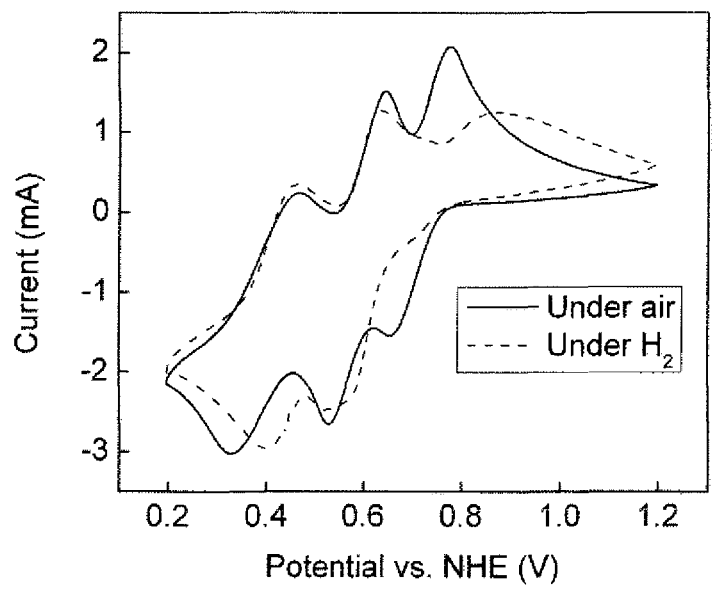
FIG. 18 is a comparison of the CV of 0.5 M phosphomolybdic acid under air (solid line) and under $H_2$ (dashed line).

However, the CV of phosphomolybdic acid under $H_2$ (FIG. 18) evinces a lower degree of reversibility than in air or under Ar. The CVs in FIG. 18 show that the previously fully reversible (in air) reduction waves in the region +0.2 V to +1.2 V (vs. NHE) become quasi-reversible when under an atmosphere of hydrogen. This is especially true of the first 2-electron reduction at around +0.65 V vs. NHE, which becomes much flatter and broader than the corresponding wave in air. Hence during hydrogen production, it may prove necessary to continually remove $H_2$ from the headspace (e.g. by compression for storage) in order to maintain the full reversibility of the PEB redox waves. As the waves are fully reversible under air, there should be less need to do this during the water oxidation reaction.

FIG. 18 is Comparison of the CV of 0.5 M phosphomolybdic acid under air (solid line) and under $H_2$ (dashed line). A three-electrode, single compartment setup was used, with a 2 mm diameter Pt disc working electrode, carbon cloth counter electrode and an Ag/AgCl reference electrode at a scan rate of 100 $mVs^{-1}$, without any JR compensation Mass Spectrometry All MS data were collected in aqueous medium using a Q-trap, time-of-flight MS (Maxis Impact) instrument supplied by Bruker Daltonics Ltd. The detector was a time-of-flight, micro-channel plate detector and all data was processed using the Bruker Daltonics Data Analysis 4.1 software, whilst simulated isotope patterns were Investigated using Bruker Isotope Pattern software and Molecular Weight Calculator 6.45. The calibration solution used was Agilent ES tuning mix solution, Recorder No. G2421A, enabling calibration between approximately 300 m/z and 5000 m/z. This solution was diluted 60:1 with MeCN. Samples were introduced into the MS via direct injection at 100 µl/h.

The ion polarity for all MS scans recorded was negative, at 180° C., with the voltage of the capillary tip set at 4500 V, end plate offset at –500 V, funnel 1 RF at 300 Vpp and funnel 2 RF at 400 Vpp. All samples for mass spectrometry were prepared as follows. A 0.5 M solution of phosphomolybdic acid was electrolyzed at two Pt mesh electrodes with an Ag/AgCl reference electrode in a two-compartment Nafion membrane cell, until the appropriate amount of charge had been passed. A 0.1 mL sample of this electrolysis solution was then removed and diluted with 4.9 mL delonised water. A 0.1 mL of this more diluted solution was then taken, and diluted with 3.9 mL MeCN. These samples were then used for direct injection into the MS. The resulting spectra (data not shown) show that the PEB does not decompose or degrade when it is reduced and re-oxidised (as evinced by the similarity in the spectra).

Quinone Mediator

Figure 19:
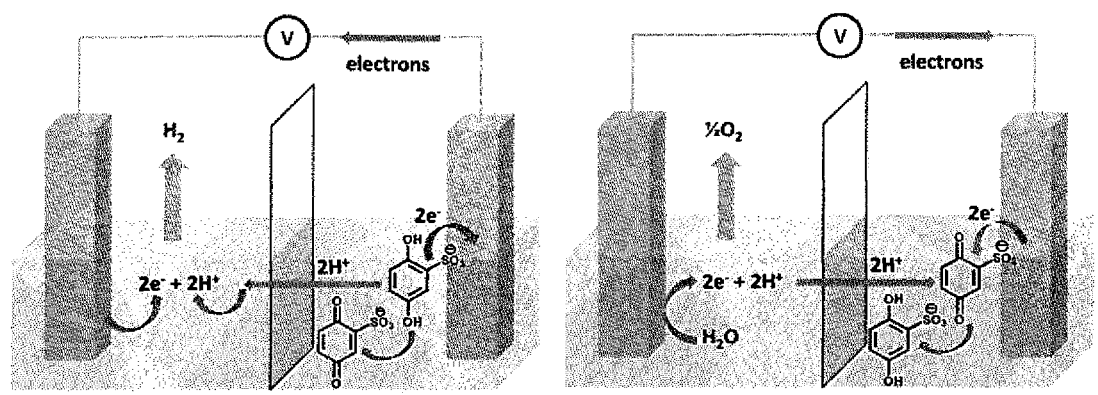
FIG. 19 is a schematic of a quinone-based mediator approach to generating hydrogen and oxygen by water-splitting. The left-hand process (oxygen generation) need not occur simultaneously with the right hand process (hydrogen generation).

As an alternative to phosphomolybdic acid, a quinone compound was used as a mediator in electrochemical cells for the generation of hydrogen and oxygen. FIG. 19 is a schematic of a quinone-based mediator approach to generating hydrogen and oxygen by water-splitting FIG. 19 shows a schematic of a two cells system for generating hydrogen (left cell) and oxygen (right cell) using a 1,4-benzoquinone-2-sulfonate and its reduced partner, 1,4-dihydro-benzene-2-sulfonate.

Figure 20:
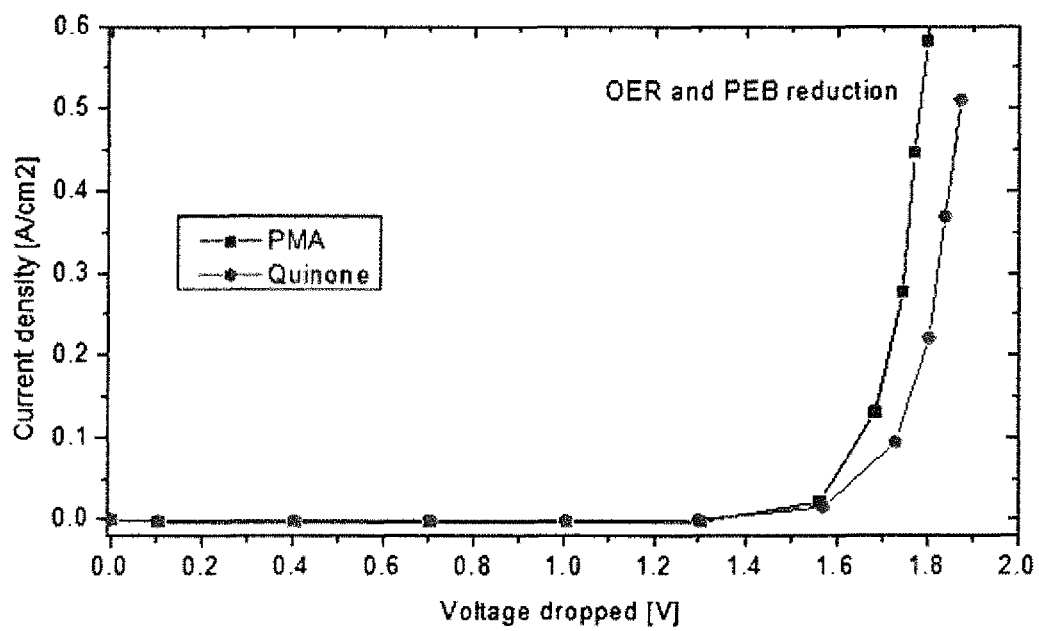
FIG. 20 shows the change in current density with the change in voltage drop for the mediators phosphomolybdic acid (squares) and 1,4-benzoquinone-2-sulfonate (circles).
Figure 20:
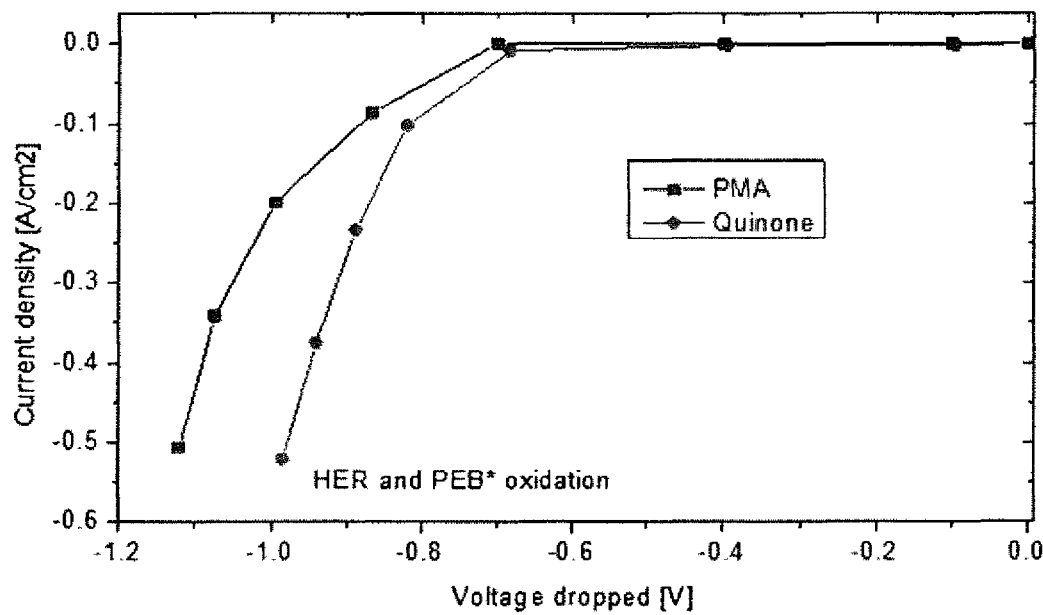

The mediator 1,4-benzoquinone-2-sulfonate was used in a hydrogen evolving cell at 0.5 M at pH 0.77 in a phosphate buffer. For comparison, the mediator phosphomolybdic acid was used in a hydrogen evolving cell at 0.5 M at pH 0.35 in a phosphate buffer. The cell made use of a Pt working electrode, a carbon reference and counter electrode and a Nafion membrane. The mediator was placed in the electrochemical cell at the working electrode side of the membrane. FIG. 20 shows the change in current with voltage drop for hydrogen evolution experiments, comparing 1,4-benzoquinone-2-sulfonate with PMA, where PMA is phosphomolybdic acid.

Figure 21:
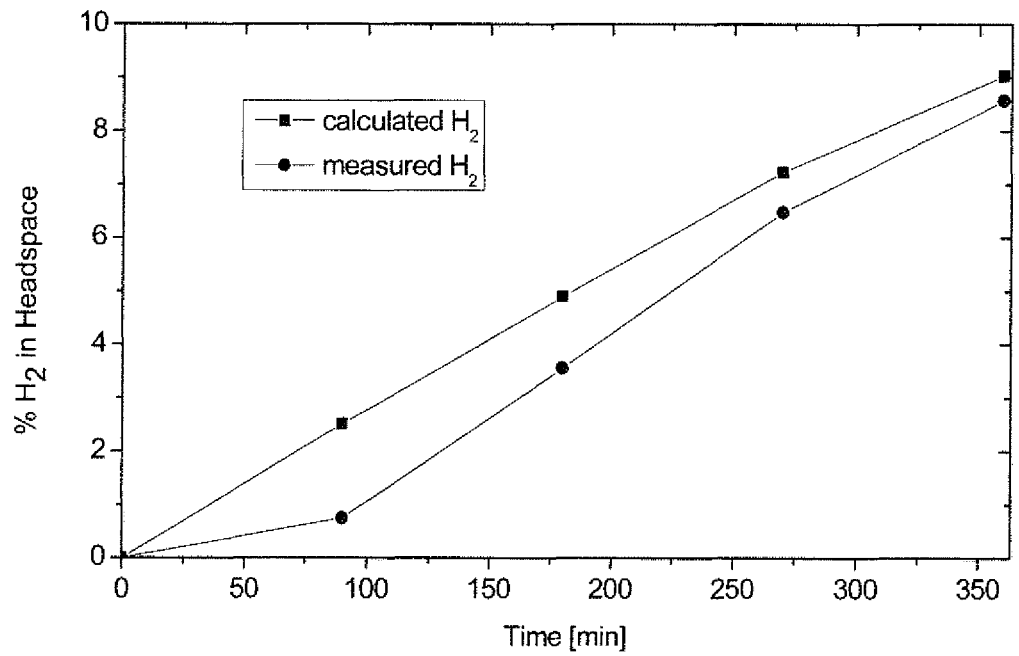
FIG. 21 shows the change in the % amount of hydrogen in the headspace of an electrochemical cell where a 1,4-benzoquinone-2-sulfonate mediator is used. The upper line (squares) corresponds to the theoretical amount of hydrogen present and the lower line (circles) corresponds to measured amount of hydrogen in the electrochemical reaction.

FIG. 21 shows the change in the amount of hydrogen located in the headspace of the electrochemical cell used in the experiment above. After a reaction time of ca. 350 mins 94.9% of the theoretical amount of hydrogen available had been produced form the system.

Figure 22:
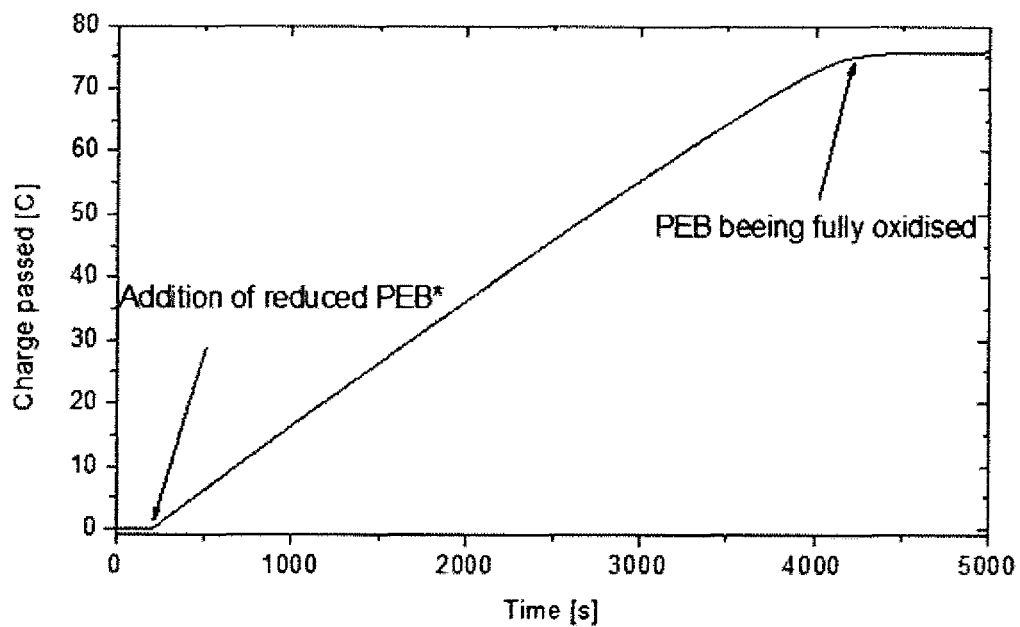
FIG. 22 shows the change in charge passed over time for a 1,4-benzoquinone-2-sulfonate mediator that is oxidised in a hydrogen evolution reaction.

FIG. 22 shows the change in total charge passed in a hydrogen evolving cell before and after the mediator 1,4-benzoquinone-2-sulfonate is added. The cell comprises a Pt working electrode, and a carbon felt counter and reference electrode. The voltage was –0.8 V. Before addition of the mediator, the current observed was at a background level only. Addition of the mediator results in an increase in the current passed by about 78 times. Once the mediator is completely oxidised, the total current does not increase. The recorded data showed that 98.3% of the theoretical amount of charge had been passed.

Figure 23:
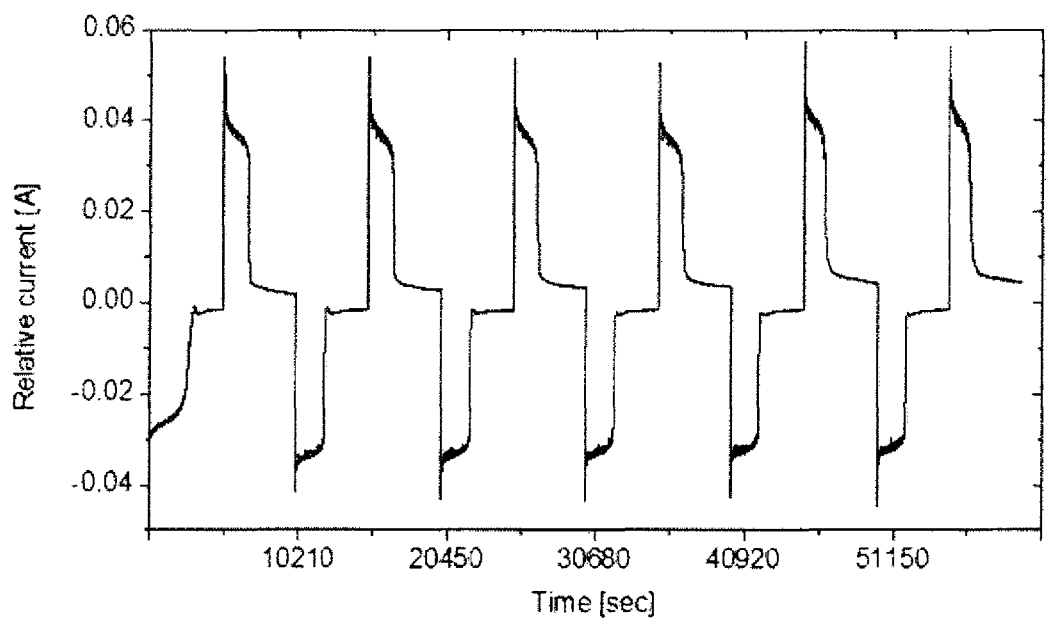
FIG. 23 shows the change in relative current over time for repeated cycles of oxidation and reduction of a 1,4-benzoquinone-2-sulfonate mediator.
Figure 24:
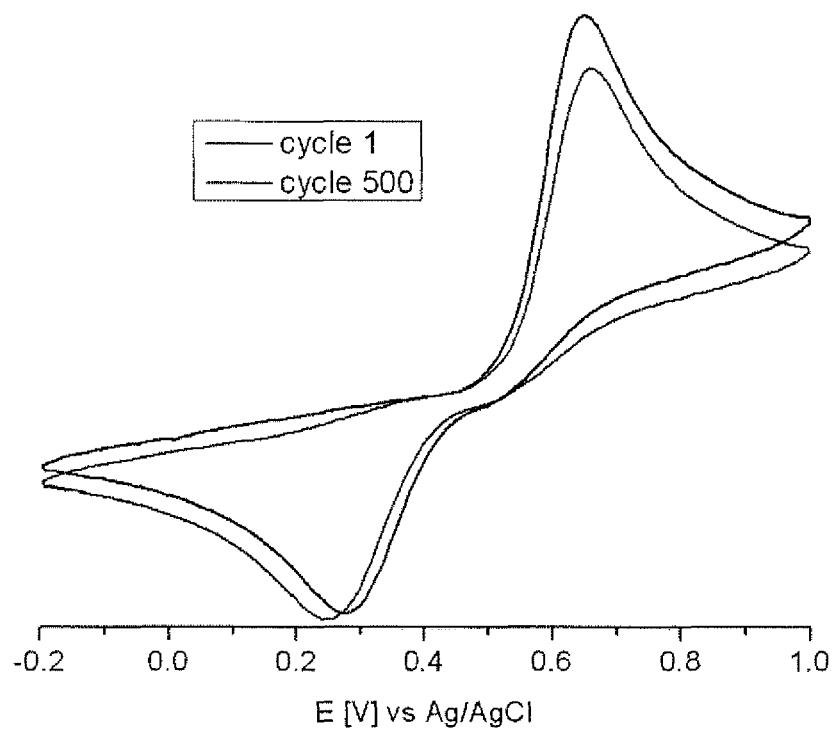
FIG. 24 shows the CV spectra for the 1,4-benzoquinone-2-sulfonate mediator (as a 1:1 mixture of the quinone and hydroxy forms) after 1 cycle and after 500 cycles of oxidation and reduction.

FIGS. 23 and 24 show that the mediator 1,4-benzoquinone-2-sulfonate retains its activity over many oxidation and reduction (CV) cycles. FIG. 24 shows that the electrochemical reactivity of the mediator 1,4-benzoquinone-2-sulfonate remains substantially the same after 500 CV cycles. The CV experiments were performed with a 1:1 mixture of 1,4-benzoquinone-2-sulfonate and 1,4-dihydroxy-2-sulfonate in a phosphate buffer at pH 1, with a glassy carbon working electrode, a Pt counter electrode and a silver/silver chloride reference electrode.

The stability of the mediator 1,4-benzoquinone-2-sulfonate was also established in buffered electrolyte at pH 4 and pH 7 (data not shown).

COMPARATIVE EXAMPLE

Investigation of the $I^-/IO_3^-$ Relay as a PEB

Water splitting using "redox mediators" that have redox waves in between OER onset and HER onset (such that the potential needed to split water is divided into two halves) has previously been demonstrated in photochemical systems known as artificial Z-schemes (Bard et al.). The two most popular relays to use in this regard are the $Fe^{2+}/Fe^{3+}$ couple and the $I^-/IO_3^-$ couple (Darwent et al.; Abel et al.; Maeda et al.). Neither relay, however, is suitable for use as a PEB. In the case of the $I^-/IO_3^-$ couple, it is known that oxidation of the iodide does not lead cleanly to the iodate species, but rather forms mixtures of iodate and iodine, which can further react to give $I_3^-$ species (Darwent et al.; Abel et al.; Maeda et al; Skolnik et al.). When we attempted to use NaI as a PEB (see below), we observed very rapid discolouring of the PEB during the oxidation step at mild potentials (both pure NaI and pure $NaIO_3$ should give colourless solutions). A subsequent starch test on the PEB compartment showed that iodine had indeed been formed. The $Fe^{2+}/Fe^{3+}$ couple is unsuitable as a PEB on account of the small size of the Ions (which means benzoylated cellulose membranes will not retain them in one side of the cell), their positive charge (which means that the ions may permeate through Nafion membranes, which they are in any case known to attack) and because $Fe^{2+}$ salts are not stable in aqueous solution, and tend to spontaneously re-oxidise to $Fe^{3+}$ salts (hence aerial re-oxidisation of the $Fe^{2+}$ would compete with electrochemical re-oxidation, reducing yields of $H_2$). For these reasons, neither of the above couples can compete with phosphomolybdic acid as an effective and stable PEB.

A 0.5 M solution of NaI in water (4 mL, pH=5.0), was placed in one side of an H-cell, and 7 mL 0.1 M $NaH_2PO_4$ (pH=4.7) was placed in the other compartment. The compartments were separated by a Nafion membrane. The NaI compartment was further equipped with a Pt mesh working electrode and an Ag/AgCl reference electrode, whilst the $NaH_2PO_4$ compartment contained a Pt mesh counter electrode. Bulk electrolysis was commenced at +1.0 V vs. Ag/AgCl. Soon after the initiation of the electrolysis, the working electrode compartment went yellow, and then got progressively darker.

A test with starch solution showed that $I_2$ was then present in this chamber (starch tests with NaI and $NaIO_3$ solutions did not show any $I_2$ to be present in these). After 75 C of charge had been passed (around 40% of the charge required for a full 1-electron oxidation of the NaI), precipitation occurred in the working electrode compartment and the electrolysis was terminated. The working electrode compartment at this stage was dark brown and cloudy.

REFERENCES

A. Damjanovic, A. Dey, J. O'M. Bockris, *J. Electrochem. Soc.* 113, 739 (1966)
W. Erbs, J. Desilvestro, E. Borgarello, M. Grätzel, *J. Phys. Chem.* 88, 4001 (1984)
S. Itagaki, K. Yamaguchi, N. Mizuno, *Chem. Mater.* 23, 4102 (2011)
Long et al. *Angew. Chem. Int. Ed.* 2010, 49, 1736
W. Erbs, J. Desilvestro, E. Borgarello, M. Grätzel, *J. Phys. Chem.* 68, 4001 (1984)
Y. Miseki, H. Kusama, H. Sugihara, K. Sayama, *J. Phys. Chem. Left* 1, 1196(2010)
A. Pozio, R. F. Silva, M. De Francesco, L. Giorgi, *Electrochim. Acta* 48, 1543 (2003)
G. A. Tsigdinos, *Ind. Eng. Chem., Prod. Res. Develop.* 13, 267 (1974)

ADDITIONAL REFERENCES

Abe, R., Sayama, K. & Sugihara, H. *J. Phys. Chem.* B 109, 16052-16061 (2005).
Armaroli, N. & Balzani, V. *Chem Sus Chem.* 4, 21-36 (2011).
Atlam, O. *Int J. Hydrogen Energy* 34, 6589-6595 (2009).
Barber, J. *Chem. Soc. Rev.* 38, 185-196 (2009).
Barbir, F. *Sol. Energy.* 78, 661-669 (2005).
Bard, A. J. *J. Photochem.* 10, 59-75 (1979).
Burke, L. D., Murphy, O. J., O'Neill, J. F. & Venkatesan, S. *J. Chem. Soc., Faraday Trans.* 1, 73, 1659-1671 (1977).
Chen, X., Shen, S., Guo, L. & Mao, S. S. *Chem. Rev.* 110, 6503-6570 (2010).
Cook, T. R. et al. *Chem. Rev.* 110, 6474-6502 (2010).
Darwent, J. R. & Mills, A. *J. Chem. Soc., Faraday Trans.* 2.78, 359-367 (1982).
Davis, S. J., Caldeira, K. & Matthews, H. D. Future $CO_2$ *Science* 329, 1330-1333 (2010).
Engstrom, R. C. & Strasser, V. A. *Anal. Chem.* 56, 136-141 (1984).
Funk, J. E. *Int. J. Hydrogen Energy* 26, 185-190 (2001).
Gust, D., Moore, T. A. & Moore, A. L. *Acc. Chem. Res.* 42, 1890-1898 (2009).
Hamann, C. H., Hamnett, A. & Vielstich, W. *Electrochemistry* ($2^{nd}$. Edition). Wiley-VCH, Weinheim.
Häussinger, P., Lohmüller, R. & Watson, A. M. Ullmann's Encyclopedia of Industrial Chemistry, *Hydrogen*, 2. Production. Wiley-VCH, Weinheim (2005).
Hernández-Pagán. E. A. et al. *Energy Environ. Sci.* 5, 7582-7589 (2012).
Himeno, S. & Takamoto. M. *J. Electroanal. Chem.* 528, 170-174(2002).
Holladay, J. D., Hu, J., King, D. L. & Wang, Y. *Catal. Today* 139, 244-260 (2009).
Hydrogen Production, Worldwide and U.S. Total Hydrogen Production, U.S. Department of Energy Hydrogen Analysis Resource Center, http://hydrogen.pnl.gov/cocoon/morf/hydrogen/article/706, accessed Jun. 26, 2012.
Kanan, M. W. & Nocera, D. G. *Science* 321, 1072-1075 (2008).
Lewis, N. S. & Nocera, D. G. *Proc. Natl. Acad. Sci. U.S.A.* 103, 15729-15735 (2006).
Lodi, G., Sivieri, E., De Battisti, A. & Trasatti, S. *J. Appl. Electrochem.* 8, 135-143 (1978).

Maeda, K., Higashi, M., Lu, D., Abe, R. & Domen, K. *J. Am. Chem. Soc.* 132, 5858-5868 (2010).
Maeda, K., Himeno, S., Osakai, T., Saito, A. & Hod, T. *J. Electroanal. Chem.* 364, 149-154 (1994).
Merid, D., Fierro, S., Vrubel, H. & Hu, X. *Chem. Sci.* 2, 1262-1267 (2011).
Miras, H. N., Stone, D., Long, D.-L., McInnes, E. J. L., Kögerler, P. & Cronin, L. *Inorg. Chem.* 50, 8384-8391 (2011).
Miras, H. N., Wilson, E. F. & Cronin, L. *Chem. Commun.*, 1297-1311 (2009).
Olah, G. A., Prakash, G. K. S. & Goeppert, A. *J. Am. Chem. Soc.* 133, 12881-12898 (2011).
Onuki, K., Kubo, S., Terada, A., Sakaba, N. & Hino, R. *Energy Environ. Sci.* 2, 491-497 (2009).
Paul, B. & Andrews, J. *Int J. Hydrogen Energy* 33, 490-498 (2008).
Pozio, A., Silva, R. F., De Francesco, M. & Giorgi, L. *Electrochim. Acta* 48, 1543-1549 (2003).
Schrock, R. R. *Proc. Natl. Acad. Sci. U.S.A.* 103, 17087 (2006).
Skolnik, E. G. Compilation Of Site Visit-Based Technical Evaluations Of Hydrogen Projects 1996-2001, Washington D.C. (2002); http://www.osti.gov/bridge/servlets/purl/815055-bLCRmy/native/815055.pdf (accessed 28 Oct. 2012).
Sleutels, T. H. J. A., Hamelers, H. V. M., Rozendal, R. A. & Buisman, C. J. N. *Int. J. Hydrogen Energy* 34, 3612-3620 (2009).
Tanaka, N., Unoura, K. & Itabashi, E. *Inorg. Chem.* 21, 1662-1666 (1982).
Tsigdinos, G. A *Top. Curr. Chem.* 76, 1-64 (1978).
Walter, M. G. et al. *Chem. Rev.* 110, 6446-6473 (2010).

The invention claimed is:

1. A method for producing hydrogen and oxygen from water or an aqueous electrolyte solution, the method comprising the steps of:
   (i) reducing an oxidised mediator at a working electrode to yield a mediator, and oxidising water or an aqueous electrolyte solution at a counter electrode to yield oxygen; and
   (ii) oxidizing the mediator to yield hydrogen;
   wherein the oxygen generation step is performed non-simultaneously to the hydrogen generation step, and the oxidized mediator of step (ii) is used as the oxidized mediator of step (i), or the mediator of step (i) is used as the mediator of step (ii), and the mediator has a reversible redox wave lying between the onset of the oxygen evolution reaction (OER) and the hydrogen evolution reaction (HER).

2. The method of claim 1, wherein the mediator is a H$^+$ donor and/or acceptor.

3. The method of claim 1, wherein the mediator and the oxidized mediator are prevented from contacting the counter electrode.

4. The method of claim 1, wherein the mediator and/or the oxidized mediator are provided in an acidic electrolyte.

5. The method of claim 1, wherein the mediator is provided in an electrolyte, and the pH of the electrolyte remains substantially constant throughout step (i).

6. The method of claim 1, wherein the mediator has a reversible redox wave lying in the range of +0.3 to +0.9 V vs NHE.

7. The method of claim 1, wherein the mediator is a polyoxometallate.

8. The method of claim 7, wherein the polyoxometallate and/or the oxidized polyoxometallate comprises 2, 3, 6, 7, 12, 18, 24, 30 or 132 metal atoms.

9. The method of claim 8, wherein the metal atoms in the polyoxometallate and/or the oxidized polyoxometallate are selected from the group consisting of W, Mo, V and Nb, and combinations thereof.

10. The method of claim 9, wherein the polyoxometallate is of formula $[M_{12}O_{40}X]^{n-}$ where M is a metal, such as Mo, W or V, or mixtures thereof, X is P or S, and n is 3, 4, 5 or 6 as appropriate.

11. The method of claim 7, wherein the oxidized polyoxometallate is $H_3Mo_{12}PO_{40}$ and the polyoxometallate is $H_5Mo_{12}PO_{40}$.

12. The method of claim 1, wherein the oxidized mediator is a 1,4-quinone compound and the mediator is a dihydrobenzene compound.

13. The method of claim 12, wherein the oxidized mediator is a 1,4-quinone compound and the mediator is a 1,4-dihydrobenzene compound.

14. The method of claim 1, wherein the mediator and the oxidized mediator are anionic.

15. The method of claim 1 wherein step (i) is performed first, followed by step (ii).

16. The method of claim 1, wherein step (ii) includes the application of a bias between the working and counter electrodes of at most 2.0 V.

17. The method of claim 1, wherein a photocatalyst is provided in step (i) and/or step (ii), and the photocatalyst is illuminated.

18. The method of claim 17, wherein the photocatalyst is activatable when illuminated by visible light.

19. The method of claim 18, wherein the photocatalyst is or comprises $WO_3$.

20. The method of claim 1 further comprising the steps of collecting the produced hydrogen and oxygen.

21. The method of claim 1, wherein step (ii) includes the recovery of the oxidized mediator; and/or step (i) includes the recovery of the mediator.

22. The method of claim 1, wherein step (ii) comprises oxidizing the mediator at a working electrode to yield an oxidized mediator, and reducing protons at a counter electrode to yield hydrogen.

23. The method of claim 1 wherein step (i) comprises reducing an oxidized mediator at a carbon working electrode to yield a mediator.

24. The method of claim 1 wherein step (i) comprises oxidizing water at a Pt counter electrode to yield oxygen.

* * * * *